(12) United States Patent
Atsumi et al.

(10) Patent No.: US 6,744,573 B2
(45) Date of Patent: Jun. 1, 2004

(54) OPTICAL ELEMENT

(75) Inventors: Motohiro Atsumi, Hachioji (JP);
Yoshihiro Maeda, Hachioji (JP);
Nobuo Miyairi, Kanagawa (JP);
Hirotoshi Ichikawa, Hachioji (JP)

(73) Assignee: Olympus Corporation (JP)

( * ) Notice: Subject to any disclaimer, the term of this patent is extended or adjusted under 35 U.S.C. 154(b) by 33 days.

(21) Appl. No.: 10/217,676

(22) Filed: Aug. 12, 2002

(65) Prior Publication Data

US 2003/0048550 A1 Mar. 13, 2003

(30) Foreign Application Priority Data

Aug. 22, 2001 (JP) ........................ 2001-251849
Sep. 25, 2001 (JP) ........................ 2001-292233

(51) Int. Cl.$^7$ ............................ G02B 7/02; G02B 27/14
(52) U.S. Cl. ........................................ 359/819; 359/631
(58) Field of Search ................................ 359/630, 631, 359/633, 637, 638, 639, 640, 819; 345/7, 8

(56) References Cited

U.S. PATENT DOCUMENTS 5,912,769 A * 6/1999 Iizuka et al. ............... 359/631
6,049,429 A * 4/2000 Iizuka et al. ............... 359/631
6,330,121 B1 * 12/2001 Kobayashi et al. ......... 359/831
6,441,978 B1 * 8/2002 Kobayashi et al. ......... 359/834

FOREIGN PATENT DOCUMENTS

JP  9-73005  3/1997

* cited by examiner

*Primary Examiner*—Ricky Mack
(74) *Attorney, Agent, or Firm*—Ostrolenk, Faber, Gerb & Soffen, LLP

(57) ABSTRACT

Element fixing mounting portions are formed in the shape of bridge beams on both the side surfaces or the like of the first optical surface, which is disposed in confrontation with an image display element, of a Free-Form-Surface prism 61 acting as an optical element, the side surfaces being located externally of the effective light beam range of the first optical surface. Then, the optical element can be mounted on a cabinet making effective use of a space by projecting positioning bosses or the like from the mounting portions, the bosses being used when optical element is mounted on the cabinet.

19 Claims, 39 Drawing Sheets

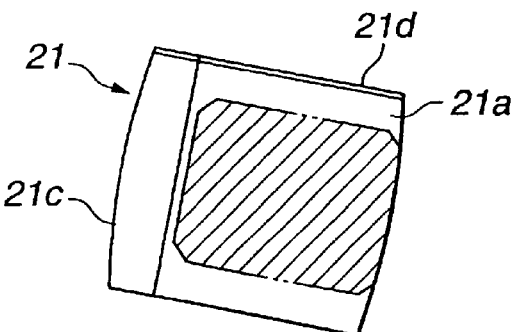
FIG.10B
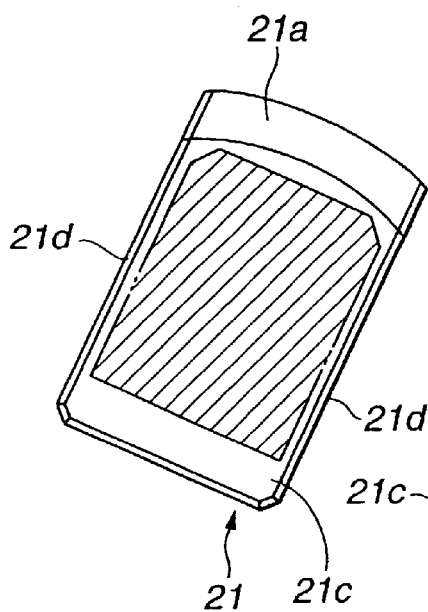
FIG.10D
FIG.10A
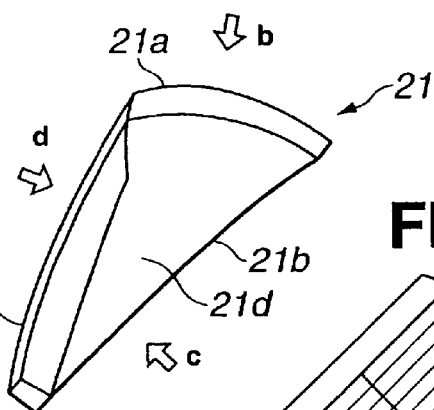
FIG.10C
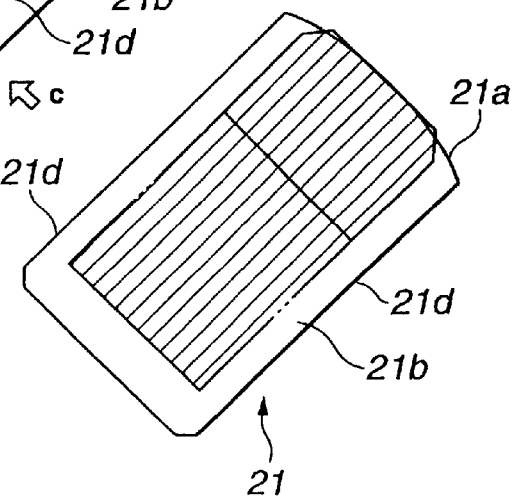

OPTICAL ELEMENT

This application claims benefit of Japanese Application Nos. 2001-251849 filed on Aug. 22, 2001 and 2001-292233 filed on Sep. 25, 2001, the contents of which are incorporated by this reference.

BACKGROUND OF THE INVENTION

Field of the Invention and Description of the Related Art

The present invention relates to an optical element for enlarging an image displayed on an image display element.

In general, to obtain a good optical performance in an optical device using an optical element such as a prism, or the like, it is necessary to position the optical element with respect to a cabinet and to other optical element and to fix it in the cabinet or to the other optical element accurately with a pinpoint accuracy.

The optical element is typically represented by an optical prism. Since the optical prism has the smaller number of flat surfaces acting as a reference, there are conventionally proposed various methods as a fixing method of it.

For example, an optical prism 1 as a prior example shown in FIG. 1 is arranged such that flange portions 1a project from two confronting surfaces that do not contribute to the optical action of the optical prism 1, screw insertion holes 1b are drilled through the flange portions 1a as well as positioning pins 1c project from the back surfaces of the flange portions 1a.

In contrast, a cabinet 2 to which the optical prism 1 is fixed has joint surfaces 2a against which the flange portions 1a provided with the optical prism 1 are abutted, and then screw holes 2b are threaded into the joint surfaces 2a at the positions thereof corresponding to the screw insertion holes 1b, and further positioning recessed portions 2c, into which the positioning pins 1c are inserted, are drilled into the joint surfaces 2a.

In assembly, the optical prism 1 is fixed to the cabinet 2 by abutting the back surfaces of the flange portions 1a, which project from both the side surfaces of the optical prism 1, against the joint surfaces 2a formed on the cabinet 2, by positioning the optical prism 1 with respect to the cabinet 2 by inserting the positioning pins 1c, which project from the back surfaces of the flange portions 1a, into the positioning recessed portions 2c drilled into the joint-surfaces 2a, and by driving screws 3, which have been inserted through the screw insertion holes 1b, into the screw holes 2b drilled into the joint surfaces 2a.

In this case, as shown in FIGS. 2 and 3, each flange portion 1a may be cut to shorten its size up to the position where the screw insertion hole 1b is halved, whereas a projecting portion 2d having a height slightly lower than the thickness of the flange portion 1a may be projected from the outside surface of each joint surface 2a of the cabinet 2.

That is, in the arrangement shown in FIGS. 2 and 3, when the flange portions 1a projecting from both the sides of the optical prism 1 are inserted between the projecting portions 2d of the cabinet 2, circular screw insertion holes are formed by the halved screw insertion holes 1b drilled through the flange portions 1a and halved screw insertion holes 2e formed on the inside surfaces of the projecting portions 2d, and the screws 3 having been inserted through the screw insertion holes are driven into the screw holes 2b drilled into the joint surfaces 2a of the cabinet 2, thereby the optical prism 1 is fixed to the cabinet 2.

As described above, since the flange portions 1a are formed in the halved state in FIGS. 2 and 3, it is possible to reduce the shape of the flange portions 1a as compared with the Free-Form-Surface prism 1 shown in FIG. 1. Further, when the screws 3 are tightened, the heads thereof are abutted against the projecting portions 2d on the cabinet 2 side and the screws 3 are prevented from being more tightened, thereby the occurrence of internal stress to the optical prism 1 is suppressed so that the deformation of the optical prism 1 can be prevented.

Further, as shown in FIG. 4, there is also known a technology for fixing the optical prism 1 to the cabinet 2 by drilling screw holes 2f through the side surfaces of the cabinet 2 and by pressing the side surfaces of the optical prism 1 by the extreme ends of set screws 3b driven into the screw holes 2f.

According to this prior example, the shape of the flange portions 1a can be more reduced because it is not necessary to drill insertion holes, through which tightening screws are inserted, through the flange portions 1a of the optical prism 1. As a result, the reduction in size of the cabinet 2 for holding it can be realized, and thus a device can be reduced in size in its entirety.

In this case, as shown in FIG. 5, the extreme ends of the set screws 3b do not directly press the side surfaces of the optical prism 1 by attaching a sheet member 4 bent in a U-shape to the inner surface of the cabinet 2 and by pressing the side surfaces of the optical prism 1 by the set screws 3b through the side surfaces 4a of the sheet member 4, thereby internal stress occurred to the optical prism 1 can be suppressed.

In contrast, as shown in FIG. 6, when the set screws 3b are arranged as pointed set screws 3c, V-shaped grooves 1d, into which the extreme ends of the pointed set screws 3c are inserted, are formed on the side surfaces of the optical prism 1, and the pointed set screws 3c are driven into the screw holes 2f threaded into the cabinet 2, the extreme ends of the pointed set screws 3c impinge on the slants of the V-shaped grooves 1d formed in the side surfaces of the optical prism 1.

When the pointed set screws 3c are further driven, the optical prism 1 is pulled in an impinging surface direction and pressed as well as can be fixed to the cabinet 2. Note that reference numeral 2g denotes pins that are inserted into guide holes drilled through the flange portions 1a and regulate the movement of the optical prism 1 in a width direction.

Further, as shown in FIG. 7, there is also known a technology for interposing elastic fixing members 5 such as spring between both the side surfaces of the optical prism 1 and the inner surfaces of the cabinet 2.

According to this prior example, a fixing and pressing force is made constant to the optical prism 1. Further, when the optical prism 1 is expanded or contracted by a temperature change, or the like, the deformation of the optical prism 1 is allowed by the elastic deformation of the elastic fixing members 5, thereby the occurrence of internal stress is prevented, thereby the breakage of the optical prism 1 can be prevented before it occurs.

Further, an optical prism 11 as shown in FIG. 8 is also known. This optical prism 11 is disclosed in, for example, Japanese Unexamined Patent Application Publication No. 9-73005. The optical prism 11 shown in FIG. 8 is used in an image observation device such as a head mount display (HMD), or the like for displaying an image displayed on a small image display element in enlargement. The optical prism 11 has a first light incident optical surface 11a composed of a flat surface or a curved surface, a second optical surface 11b composed of a flat surface or a curved surface for totally reflecting light beams incident in an element from the first optical surface 11a, a third optical surface 11c for reflecting at least a part of the light beams from the second optical surface 11b to the second optical surface 11b side, and optically positioning flange portions lid disposed to two side surfaces, which confront each other and do not execute an optical action, other than the first to third optical surfaces 11a–11c.

There is disclosed a technology for accurately holding the optical prism 11 without causing optical distortion by holding the optical prism 11 through the flange portions 11d.

However, the conventional examples described above have the following problems.

In the optical prisms 1 and 11 shown in FIGS. 1 and 8, the flange portions 1a and 11d project from the side surfaces thereof, which increases the sizes of the optical prisms in y-directions shown in FIGS. 1 and 8 and acts as an obstruction when miniaturization of the overall device is attempted.

Further, in the optical prism 1 shown in FIGS. 2 and 3, an unnatural force is prevented from acting on the optical prism 1 because a tightening force is regulated to some extent by the projecting portions 2d formed to the cabinet 2 when the screws are tightened. However, it is difficult to perfectly prevent the action of the unnatural force. As a result, strain is caused to the optical prism 1 when the dimensions of respective components are erroneously determined, the respective components are erroneously set, and the assembly conditions thereof are erroneously set, from which a disadvantage arises in that the deterioration of an optical performance is hastened.

In contrast, the respective optical prisms 1 shown in FIGS. 4–6 are fixed to the cabinet 2 by directly pressing the side surfaces of the optical prisms 1 using the set screws 3b or the like. Thus, a disadvantage arises in that internal stress is liable to be caused to the optical prisms 1 by the tightening force of the set screws 3b or the like and the optical performance is deteriorated.

Further, since the expansion rate of the optical prism 1 is different from that of the cabinet 2, there is a disadvantage in that strain is liable to be caused to the optical prism 1 when it is subjected to the influence of a temperature change and the optical performance is deteriorated thereby.

Further, in the optical prism 1 shown in FIG. 7, the side surfaces of the optical prism 1 are fixed to the inner surfaces of the cabinet by the elasticity of the elastic fixing members 5, the influence caused by the difference between the expansion rate of the optical prism 1 and that of the cabinet 2 can be absorbed by the elastic deformation of the elastic fixing members 5, and thus the optical prism 1 is unlike to be subjected to the influence of the temperature change. However, there is a disadvantage that when an external force such as vibration, impact or the like is applied to the optical prism 1, the elastic fixing members 5 are plastically deformed and the position of the optical prism 1 is liable to be dislocated thereby.

OBJECT AND SUMMARY OF THE INVENTION

An object of the present invention is to provide an optical element and an image observation device capable of realizing the miniaturization of the device in its entirety by effectively utilizing a space between the optical element and a cabinet and moreover capable of fixing the optical element to the cabinet without the occurrence of optically harmful strain.

Further, another object of the present invention is to provide an image observation device capable of realizing the cost reduction of a product by decreasing the portions of an optical element which require a dimensional accuracy as well as capable of being relatively easily assembled without influencing optical characteristics and capable of realizing the miniaturization of the product.

An optical element for enlarging an image displayed on a small image display element is characterized by including a first optical surface for capturing the image approximately facing the display surface of the image display element, a second optical surface for reflecting the light beams incident from the first optical surface in the inside of the element as well as for finally causing the light beams of an enlarged image to proceed to the eye balls of an observer, at least one reflection optical surface for contributing to at least one instance of internal reflection so that the light beams incident from the first optical surface reach the second optical surface, and side surfaces that do not contribute to optical action, wherein element fixing mounting portions are disposed to any of the first to second optical surfaces and the reflection optical surface.

Further, an optical element of the present invention for enlarging an image displayed on a small image display element is characterized by including a first optical surface for capturing the image approximately facing the display surface of the image display element, a second optical surface for reflecting the light beams incident from the first optical surface in the inside of the element as well as for finally causing the light beams of an enlarged image to proceed to the eye balls of an observer, at least one reflection optical surface for contributing to at least one instance of internal reflection so that the light beams incident from the first optical surface reach the second optical surface, and side surfaces that do not contribute to an optical action as well as including element fixing mounting portions, wherein the element fixing mounting portions are formed so as to be separated from the optical element by grooves formed on at least any two surfaces of the respective surfaces by which the optical element is formed.

BRIEF DESCRIPTION OF THE DRAWINGS

FIGS. 1 to 8 relate to prior examples, wherein:

FIG. 1 is a perspective view showing a method of fixing an optical prism of a first prior example by exploding it, FIG. 2 is a perspective view showing a modified example of FIG. 1 by exploding it, FIG. 3 is a right side elevational view, partly in cross section, of an assembled state of FIG. 2, FIG. 4 is a perspective view showing a method of fixing an optical prism of a second prior example, FIG. 5 is a perspective view showing FIG. 4 by exploding it, FIG. 6 is a right side elevational view, partly in cross section, of a modified example of FIG. 4, FIG. 7 is a perspective view showing a method of fixing an optical prism of a third prior example, FIG. 8 is a perspective view of a Free-Form-Surface prism of a fourth prior example, FIGS. 9 to 12 relate to a first embodiment of the present invention, wherein:

FIG. 10A is a perspective view showing the arrangement of a Free-Form-Surface prism used in the image observation device of FIG. 9, FIGS. 10B–10D are views observed from the directions of arrows b, c, and d in FIG. 10A, respectively.

DETAILED DESCRIPTION OF PREFERRED EMBODIMENTS OF THE INVENTION

A schematic arrangement of an image observation device of a first embodiment (and a modified example belonging to it) of the present invention will be shown below first, then a basic arrangement of a Free-Form-Surface prism constituting the image observation device will be described, and subsequently respective embodiments of the Free-Form-Surface prism will be described (FIGS. 12–38). Further, subsequently, other embodiments of the image observation device will be described (FIGS. 39–63).

Figure 9:
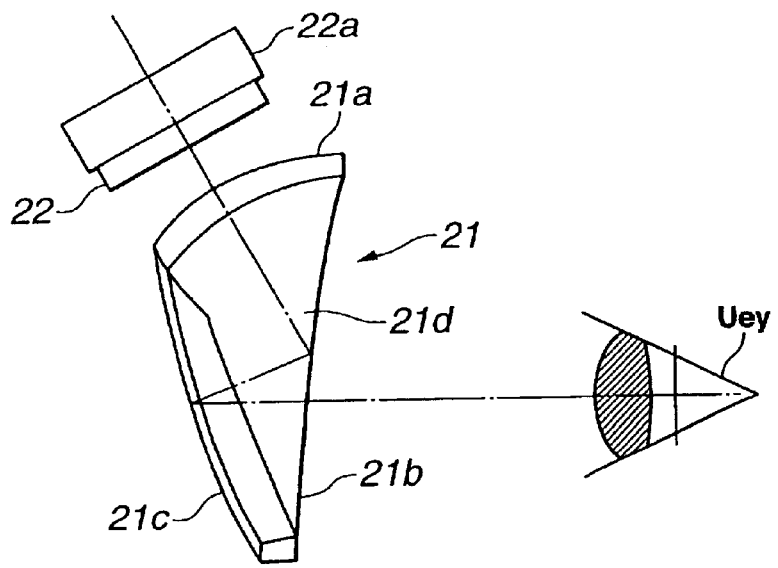
FIG. 9 is a schematic arrangement view of an image observation device of the present invention.

In FIGS. 9 to 10D, reference numeral 21 denotes a Free-Form-Surface prism acting as an optical element injection molded from a resin as a raw material. The Free-Form-Surface prism has a first optical surface 21a acting as a light incident surface, a second optical surface 21b acting as reflection, refraction and transmission surfaces partly making use of total reflection, and a reflection optical surface 21c acting as a third optical surface for executing semi-transmission or reflection.

That is, the Free-Form-Surface prism 21 has these three optical surfaces 21a–21c that execute an optical action as a whole and a pair of side surfaces 21d that confront each other and do not contribute to the optical action. Here, each of the optical surfaces 21a–21c is composed of a flat surface, a spherical surface, an aspherical surface, an aspherical surface that is plane symmetrical only to one symmetrical surface, or the like.

The display surface of a small image display element 22 approximately confronts the first optical surface 21a. Then when an image displayed on the image display element 22 is captured into the optical element from the first optical surface 21a of the Free-Form-Surface prism 21, the light beams based on the image are totally reflected by the second optical surface 21b, reflected and condensed by the reflection optical surface 21c, pass through the second optical surface 21b and then introduced to the eyeballs Uey of an observer.

At this time, the image displayed on the image display element 22 is not focused in a midway and displayed as an enlarged virtual image in front of the observer depending upon the curvatures of the second optical surface 21b and the reflection optical surface 21c.

Note that the second optical surface 21b and the reflection optical surface 21c are decentered with respect to the center axis of the eyeball Uey of the observer, the Free-Form-Surface prism 21 is also called a decentered Free-Form-Surface prism. In this case, decentering aberration caused in the second optical surface 21b and the reflection optical surface 21c is corrected by arranging them as rotation asymmetrical aspherical surfaces.

Note that the image display element 22 may be an electronic luminescent (EL) element, a plasma display, a light emitting diode (LED) array, or the like, in addition to a liquid crystal display element. However, when the liquid crystal display element is employed as the image display element 22, an illumination element 22a is disposed on the back surface thereof so that an image displayed on the liquid crystal display element can be observed with sufficient brightness.

Figure 11:
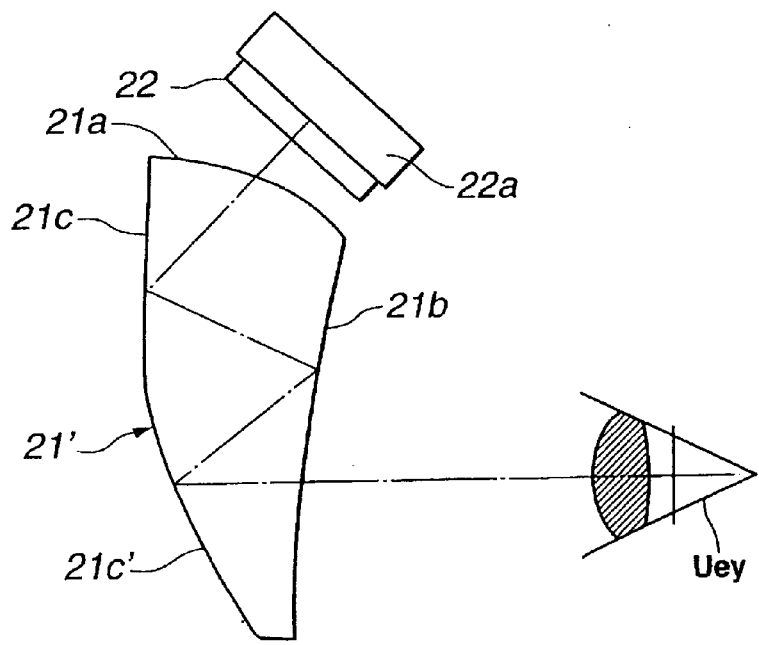
FIG. 11 is a schematic arrangement view of an image observation device of a modified example.

Further, as a modified example of FIG. 9, the light beams having been introduced from the first optical surface 21a into the element may be introduced to the reflection optical surface 21c acting as the third optical surface, totally reflected by the second optical surface 21b after they have been reflected by reflection optical surface 21c once, further reflected and condensed by a reflection optical surface 21c' that is continuous to the reflection optical surface 21c acting as the third optical surface and acts as a fourth optical surface having another defining surface, and then introduced to the eyeballs Uey of the observer from the second optical surface 21b as in a Free-Form-Surface prism 21' shown in FIG. 11.

Incidentally, as shown by hatching in FIG. 10B, the effective light beam range in the first optical surface 21a is narrower than the effective light beam range of the second optical surface 21b shown by hatching in FIG. 10C and than the effective light beam range of the reflection optical surface 21c shown by hatching in FIG. 10D. Accordingly, the prism width determined by the effective light beam ranges of the second optical surface 21b and the reflection optical surface 21c is not entirely used. This is also the same in the Free-Form-Surface prism 21' as the modified example shown in FIG. 11.

Thus, a space between the Free-Form-Surface prism 21 and a cabinet to which the Free-Form-Surface prism 21 is fixed can be effectively utilized by disposing element fixing mounting portions (hereinafter, abbreviated as "mounting portions") to the effective light beam ranges through which the light beams that are introduced to the eyeballs Uey of the observer do not actually pass regardless of that they act as optical surfaces, that is, to the regions other than the effective light beam ranges shown by the hatching in FIGS. 10B–10D (hereinafter, referred to as "ineffective light beam ranges").

Modes in which the mounting portions are disposed to the ineffective light beam ranges of the Free-Form-Surface prism 21 acting as the optical element will be described below based on FIGS. 12–38 as to each of embodiments.

The outline of the respective embodiments will be described here. First to ninth embodiments shown in FIGS. 12–23 show a mode in which the mounting portions are formed to the ineffective light beam ranges of the first optical surface 21a of the Free-Form-Surface prism 21.

Further, tenth to sixteenth embodiments shown in FIGS. 24–35 show a mode in which the mounting portions are formed on a surface extending from the ineffective light beam range of the first optical surface 21a.

Figure 36:
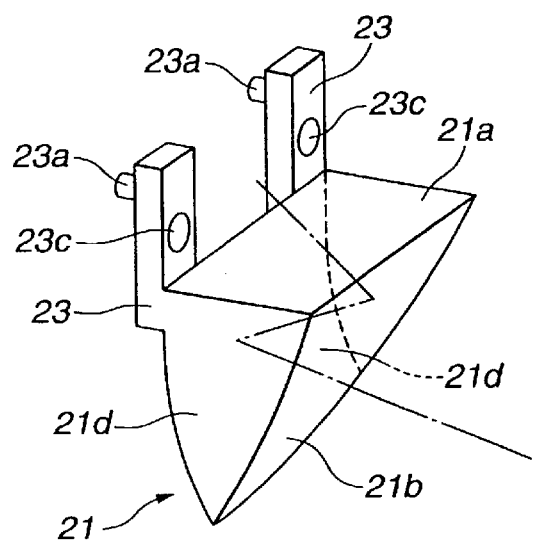
FIG. 36 is a perspective view of a Free-Form-Surface prism of a seventeenth embodiment.
Figure 37:
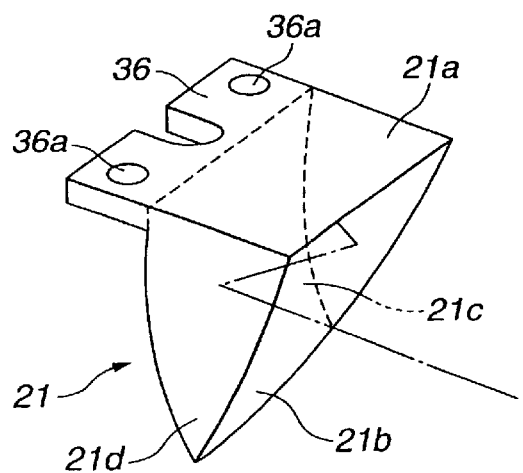
FIG. 37 is a perspective view of a Free-Form-Surface prism of an eighteenth embodiment.
Figure 38:
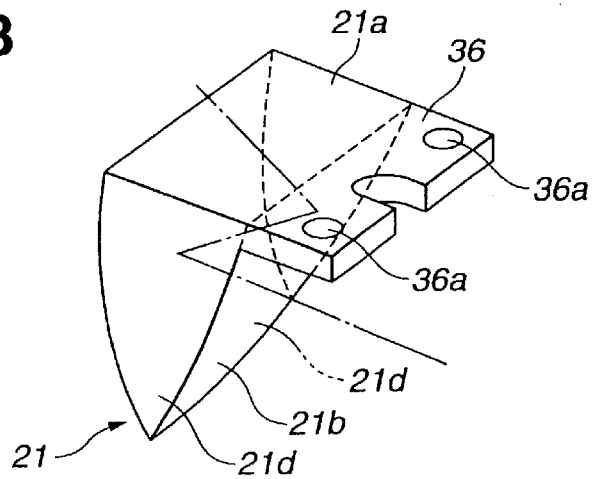
FIG. 38 is a perspective view of a Free-Form-Surface prism of a modified example of FIG. 37.

Further, seventeenth and eighteenth embodiments shown in FIGS. 36–38 show a mode in which the mounting portions are formed to the ineffective light beam range of the second optical surface 21b or the reflection optical surface 21c.

Figure 12:
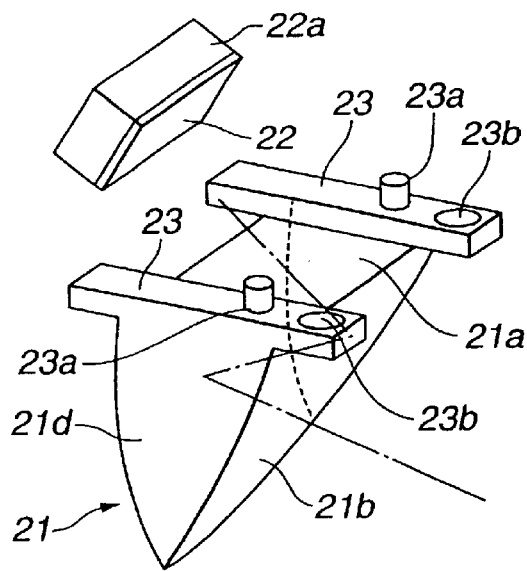
FIG. 12 is a perspective view of a Free-Form-Surface prism of a first embodiment.

First, the first embodiment of the optical element will be described based on FIG. 12. In this embodiment, bridge-beam-like mounting portions 23, which are parallel with each other, are formed integrally to the ineffective light beam ranges of the first optical surface 21a of the Free-Form-Surface prism 21 on both the side surfaces 21d sides thereof, and both the ends of each mounting portion project to the second optical surface 21b side and to the reflection optical surface 21c side.

Further, bosses 23a project from both the mounting portions 23 so as to be inserted into positioning recessed portions formed on the mounting surfaces of a not shown cabinet and fixed therein as well as screw inserting holes 23b are drilled through the extreme ends of the mounting portions 23 projecting to the second optical surface 21b side. Note that screw holes (not shown) are drilled through the mounting surface of the cabinet corresponding to the screw inserting holes 23b. Further, a dot-dash-line in the figure shows an optical axis from the image display element 22 to the eyeballs Uey of the observer, which is common also to FIG. 13 and subsequent figures.

According to this arrangement, the Free-Form-Surface prism 21 is fixed to the cabinet in such a manner that when the mounting portions 23 formed on both the sides of the first optical surface 21a of the Free-Form-Surface prism 21 in the shape of the bridge beams are attached to the mounting surface (not shown) of the cabinet, the bosses 23a projecting from the mounting portions 23 are inserted into the positioning recessed portions drilled through the mounting surface and positioned therein, and then screws, which have been inserted into the screw inserting holes 23b drilled through the extreme ends of the mounting portions 23 projecting to the second optical surface 21b side from the lower side of the figure, are driven into the screw holes threaded through the mounting surface.

As described above, since the mounting portions 23 are formed on the ineffective light beam ranges of the first optical surface 21a on both the side surfaces 21d sides thereof in the embodiment, the mounting portions 23 do not obstruct the optical action. Further, since both the ends of the mounting portions 23 project to the second optical surface 21b side and to the reflection optical surface 21c side so as not to project to the side surfaces 21d side, the space between the Free-Form-Surface prism 21 and the cabinet to which it is fixed can be effectively utilized.

It should be noted that the screw inserting holes 23b may be drilled through the extreme ends of the mounting portions 23 projecting to the reflection optical surface 21c side or may be drilled through both the extreme ends thereof projecting to the respective optical surfaces 21b and 21c in this case. It is a matter of course that screw holes are drilled through the mounting surface of the cabinet at the portions thereof corresponding to the respective screw inserting holes 23b.

Figure 13:
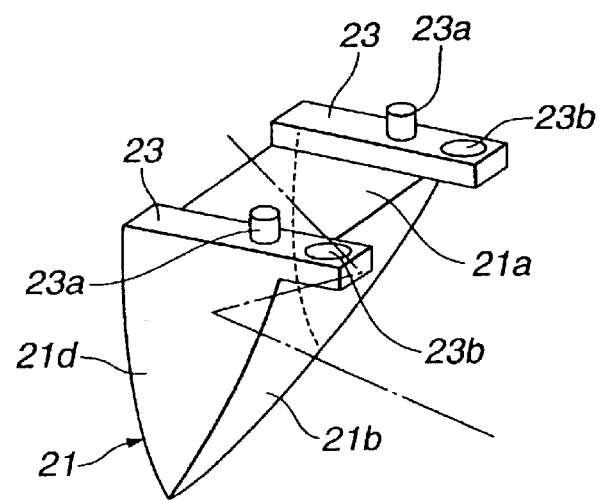
FIG. 13 is a perspective view of a Free-Form-Surface prism of a second embodiment.

Further, FIG. 13 is a perspective view of a Free-Form-Surface prism of a second embodiment of the present invention. In the first embodiment, both the ends of the mounting portions 23 project from the respective optical surfaces 21b and 21c. In this embodiment, however, the mounting portions 23 project from only the second optical surface 21b side, and the screw inserting holes 23b are drilled through the projecting extreme ends.

Since the mounting portions 23 project only from the second optical surface 21b, the shapes of both the Free-Form-Surface prism 21 and the cabinet for fixing the Free-Form-Surface prism 21 can be more reduced.

Figure 14:
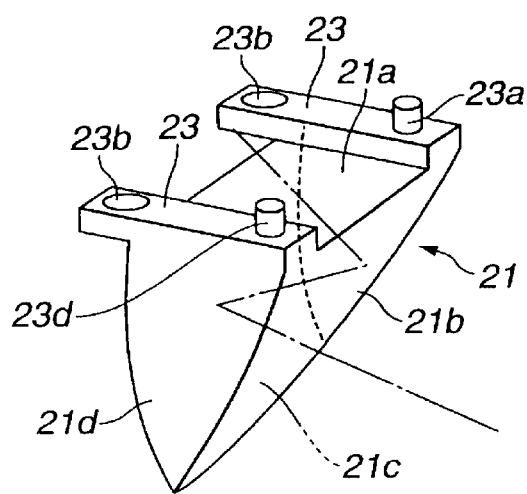
FIG. 14 is a perspective view of a Free-Form-Surface prism of a third embodiment.

Further, FIG. 14 shows a perspective view of a Free-Form-Surface prism of a third embodiment of the present invention. In the second embodiment described above, the mounting portions 23 project to the second optical surface 21b side. In this embodiment, however, the mounting portions 23 are caused to project from only the reflection optical surface 21c side, and the screw inserting holes 23b are drilled through the extreme ends of the mounting portions 23, thereby the same operation/working effect as the second embodiment can be obtained.

Figure 15:
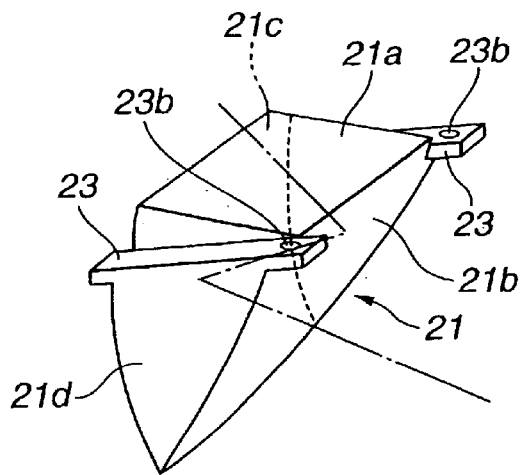
FIG. 15 is a perspective view of a Free-Form-Surface prism of a fourth embodiment.

Further, FIG. 15 is a perspective view of a Free-Form-Surface prism of a fourth embodiment of the present invention. In the first embodiment (refer to FIG. 12) described above, the mounting portions 23 are disposed approximately in parallel with the first optical surface 21a, In this embodiment, however, the surfaces of the mounting portions 23 are inclined in a direction perpendicular to an optical axis incident on the first optical surface 21a.

The mounting portions 23 are caused to be in parallel with the image display element 22 by disposing the mounting portions 23 perpendicularly to the optical axis incident on the first optical surface 21a. Thus, when it is intended to fix the Free-Form-Surface prism 21 and the image display element 22 at optically proper positions through a common coupling member, the shape of the coupling member can be simplified. Note that the mounting portions 23 may be in parallel with the optical axis incident on the second optical surface 21b in this case.

Figure 16:
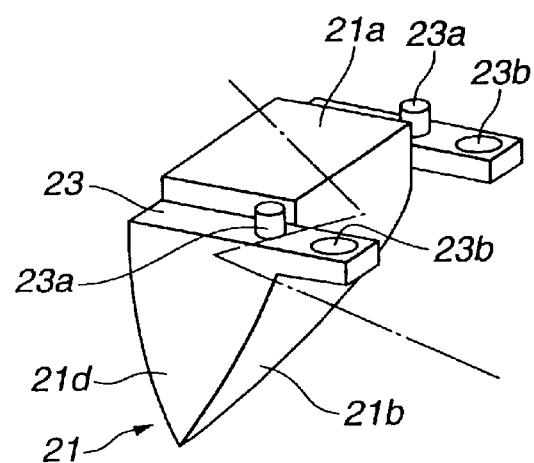
FIG. 16 is a perspective view of a Free-Form-Surface prism of a fifth embodiment.

Further, FIG. 16 shows a perspective view of a Free-Form-Surface prism of a fifth embodiment of the present invention. In the first embodiment described above, the mounting portions 23 are disposed on both the sides of the first optical surface 21a like the bridge beams. In this embodiment, however, the mounting portions 23 are formed at position one step lower than the surface of the ineffective light beam ranges on both the sides of the first optical surface 21a, and the operation/working effect thereof is the same as the first embodiment.

Figure 17:
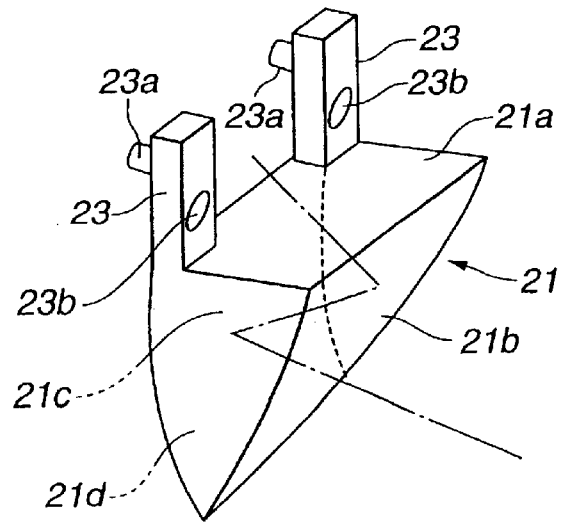
FIG. 17 is a perspective view of a Free-Form-Surface prism of a sixth embodiment.

Further, FIG. 17 shows a perspective view of a Free-Form-Surface prism of a sixth embodiment of the present invention. In this embodiment, a pair of the mounting portions 23, which are parallel with each other, extend from both the edge portions of the ineffective light beam ranges of the Free-Form-Surface prism 21, which are formed on both the sides of the first optical surface 21a of the Free-Form-Surface prism on the reflection optical surface 21c side thereof, in a direction perpendicular to the first optical surface 21a, that is, upward as shown in FIG. 17. Further, bosses 23a project from the back surfaces of the mounting portions 23 (on the reflection optical surface 21c side).

With this arrangement, the Free-Form-Surface prism 21 is fixed to the not shown cabinet in such a manner that the back surfaces of the mounting portions 23 of the Free-Form-Surface prism 21 (the reflection optical surface 21c side) are abutted against the mounting surface of the cabinet, the bosses 23a projecting from the mounting portions 23 are inserted into the positioning recessed portions formed on the mounting surface and positioned therein, and then screws having been inserted through the screw inserting holes 23b are driven into the screw holes threaded into the mounting surface of the cabinet.

It should be noted that when the mounting surface of the cabinet confronts the front surface of the mounting portions 23 of the Free-Form-Surface prism 21 (on the second optical surface 21b side), the Free-Form-Surface prism 21 is fixed in such a manner that the bosses 23a project from the front surface sides of the mounting portions 23, the front surfaces of the mounting portions 23 are abutted against the mounting surface of the cabinet and positioned thereon, and the screws are inserted into the screw inserting holes 23b from the back sides thereof.

As described above, according to this embodiment, the mounting portions 23 are formed so as to extend from the first optical surface 21a of the Free-Form-Surface prism 21 upward of the first optical surface 21a. Thus, the mounting portions 23 of the Free-Form-Surface prism 21 do not project outward from second optical surface 21b, the reflection optical surface 21c, or the side surfaces 21d, thereby the space can be effectively utilized. As a result, the reduction in size of the device including the cabinet to which the Free-Form-Surface prism 21 is fixed can be realized in its entirety.

Figure 1:
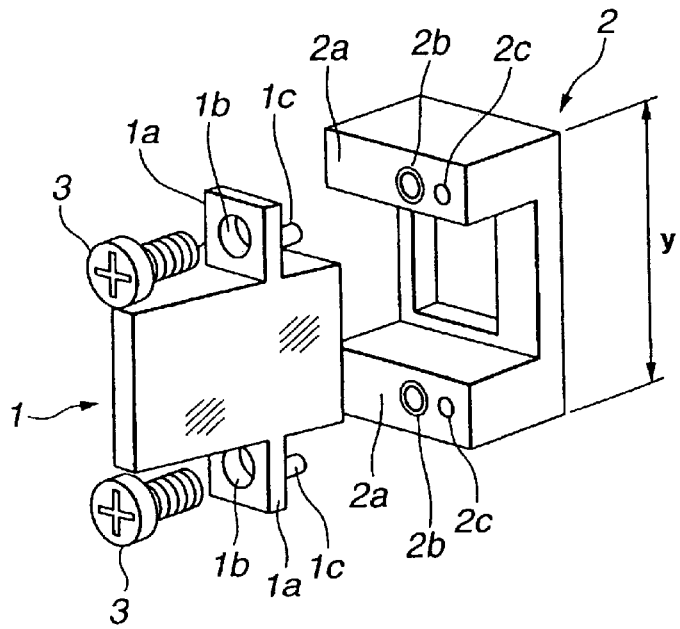
Figure 2:
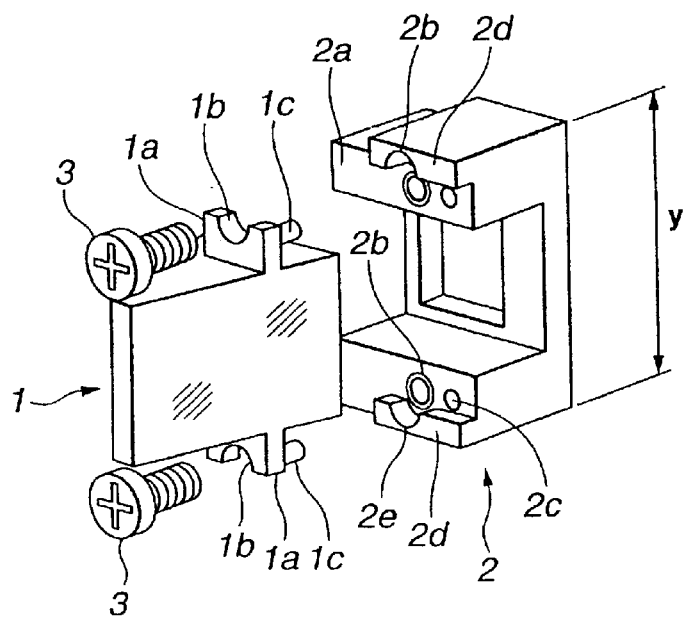
Figure 3:
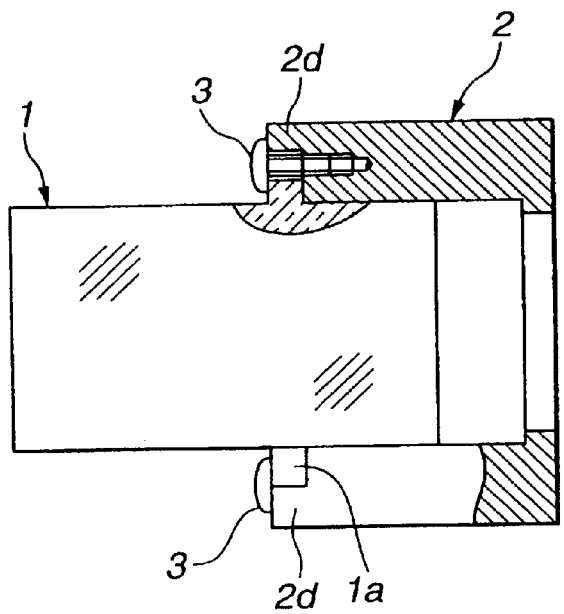
Figure 4:
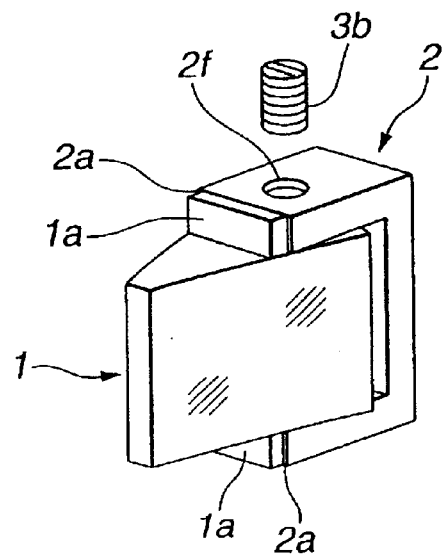
Figure 5:
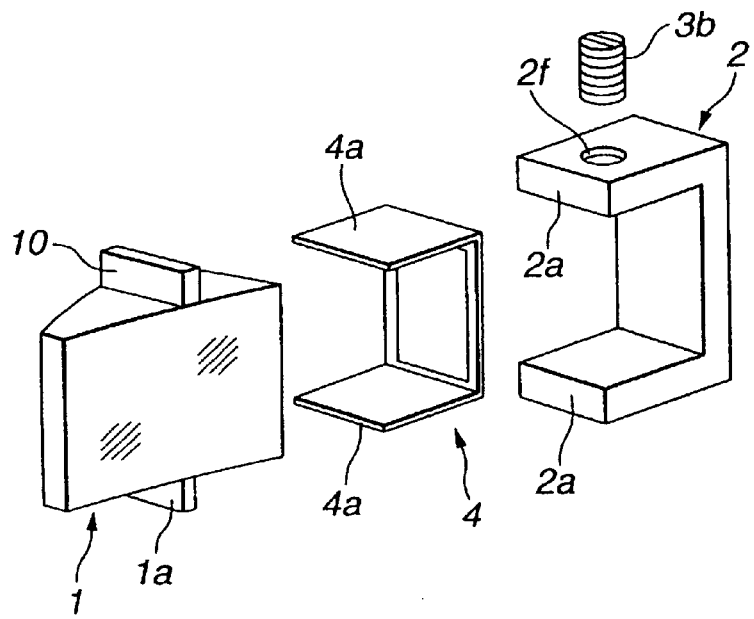
Figure 6:
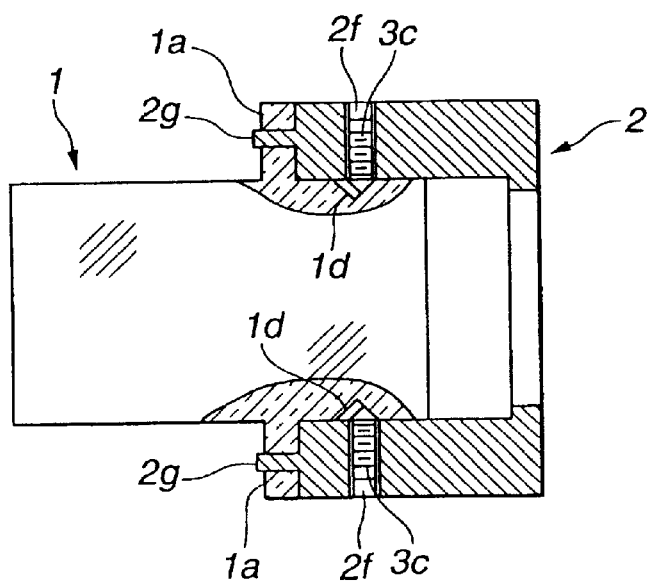
Figure 7:
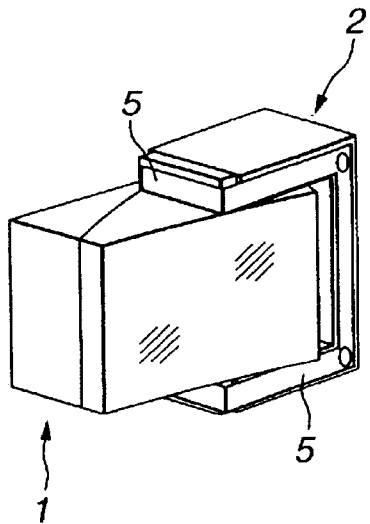
Figure 8:
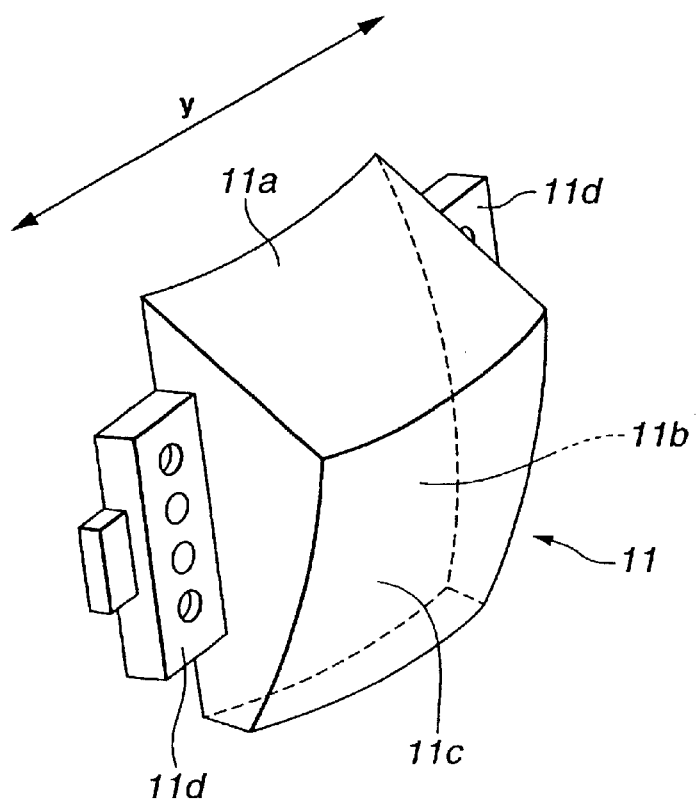

Note that, in the first to sixth embodiments, for example, the screw inserting holes 23b drilled through the mounting portions 23 may be halved similarly to the screw insertion holes 1b shown FIG. 2. Further, positioning fitting hole portions may be formed in place of the bosses 23a, and bosses fit into the positioning fitting hole portions may be disposed on the mounting surface of the cabinet.

Figure 18:
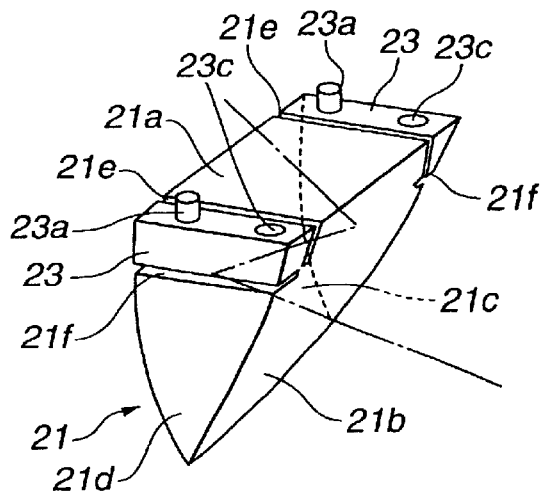
FIG. 18 is a perspective view of a Free-Form-Surface prism of a seventh embodiment.
Figure 19:
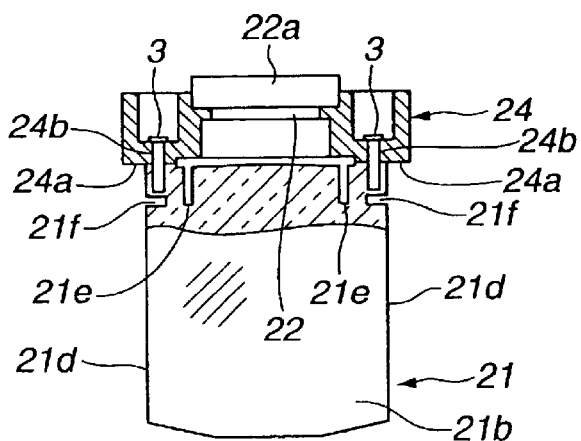
FIG. 19 is a front elevational view, partly in cross section, of the Free-Form-Surface prism in the state in which it is fixed to a cabinet.

Further, FIGS. 18 and 19 show a seventh embodiment of the present invention. Here, FIG. 18 is a perspective view of a Free-Form-Surface prism, and FIG. 19 is a front elevational view, partly in cross section, of the state in which the Free-Form-Surface prism is fixed to a cabinet.

In this embodiment, first slits 21e acting as grooves are formed on the border lines between the ineffective light beam ranges formed on both the sides of the first optical surface 21a of the Free-Form-Surface prism 21 and the effective light beam range (refer to FIG. 10B) or formed to sides slightly near to the ineffective light beam ranges from the border lines as well as second slits 21f acting as grooves are formed on the side surfaces 21d on the first optical surface 21a sides thereof, and the mounting portions 23 are separately formed by the first slits 21e and the second slits 21f to the edges that are formed by the first optical surface 21a and the side surfaces 21d of the Free-Form-Surface prism 21. Note that these slits 21e and 21f may be formed at the time the Free-Form-Surface prism 21 is injection molded.

Further, the bosses 23a project from the mounting portions 23 on the first optical surface 21a side thereof as well as screw holes 23c are threaded into the mounting portions 23.

In contrast, positioning recessed portions (not shown), into which the bosses 23a are fitted, are drilled into the mounting surfaces 24a of the cabinet 24, to which the Free-Form-Surface prism 21 is fixed, on both the sides thereof as well as screw insertion holes 24b are drilled into the mounting surfaces 24a at the positions thereof corresponding to the screw holes 23c.

In the above arrangement, when the mounting portions 23 disposed to the Free-Form-Surface prism 21 are abutted against the mounting surfaces 24a formed on the cabinet 24, the bosses 23a projecting from the mounting portions 23 are fitted into and positioned in the positioning recessed portions (not shown) formed on the mounting surfaces 24a of the cabinet 24.

Next, the screws 3 inserted through the screw insertion holes 24b drilled through the cabinet 24 are driven into the screw holes 23c to thereby position and fix the Free-Form-Surface prism 21 to the cabinet 24.

As described above, in this embodiment, the mounting portions 23 are separately formed by forming the slits 21e and 21f to the Free-Form-Surface prism 21. Thus, no projecting portion is formed to the Free-Form-Surface prism 21, thereby the space can be effectively utilized so that the device including the cabinet 24 can be reduced in size in its entirety.

Further, since the mounting portions 23 are separated from the main body of the Free-Form-Surface prism 21 through the slits 21e and 21f, the observer is prevented from directly observing the screws 3 through the second optical surface 21b, thereby the appearance quality of a product can be maintained.

Further, since strain generated when the mounting portions 23 are fixed to the mounting surfaces 24a of the cabinet 24 is absorbed by the slits 21e and 21f, no internal stress is caused to the Free-Form-Surface prism 21, thereby an optical performance can be guaranteed for a long period.

Figure 20:
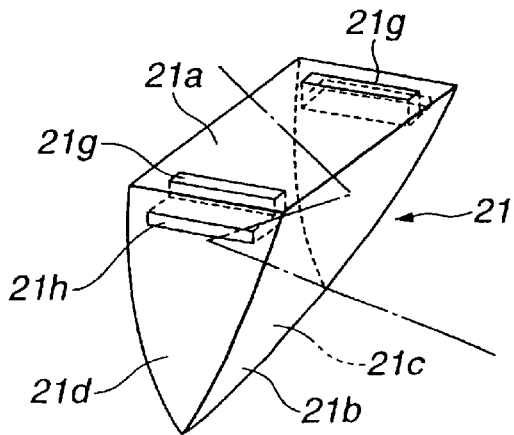
FIG. 20 is a perspective view of a Free-Form-Surface prism of an eighth embodiment.
Figure 21:
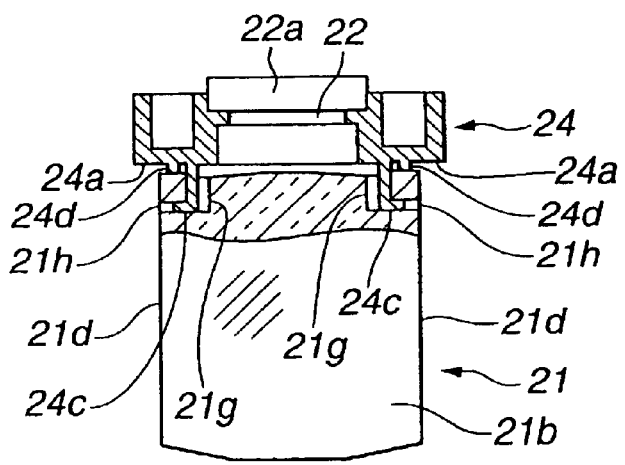
FIG. 21 is a front elevational view, partly in cross section, of the Free-Form-Surface prism in the state in which it is fixed to a cabinet.

Further, FIGS. 20 and 21 show an eighth embodiment of the present invention. Here, FIG. 20 is a perspective view of a Free-Form-Surface prism, and FIG. 21 is a front elevational view, partly in cross section, of the state in which the Free-Form-Surface prism is fixed to the cabinet.

In this embodiment, first spot facing grooves 21g are formed on the border lines between the ineffective light beam ranges formed on both the sides of the first optical surface 21a of the Free-Form-Surface prism 21 and the effective light beam range (refer to FIG. 10B) or formed to the sides slightly near to the ineffective light beam ranges from the border as well as second spot facing grooves 21h are formed on the side surfaces 21d on the first optical surface 21a sides thereof, and both the spot facing grooves 21g and 21f are communicated with one another in the Free-Form-Surface prism 21. Note that these spot facing grooves 21g and 21h may be formed at the time the Free-Form-Surface prism 21 is injection molded.

In contrast, locking claw portions 24c, which are inserted from the first spot facing grooves 21g and fitted into the second spot facing grooves 21h, are formed on the mounting surfaces 24a formed to both the sides of the cabinet 24 to which the Free-Form-Surface prism 21 is fixed.

With this arrangement, the Free-Form-Surface prism 21 is fixed to the cabinet 24 in such a manner that the mounting portions 23 are clamped by the claw portions formed at the extreme ends of the locking claw portions 24c and projecting portions 24d formed on the mounting surfaces 24a by inserting the locking claw portions 24c formed on the mounting surfaces 24a of the cabinet 24 are inserted into the first spot facing grooves 21g formed on both the sides of the first optical surface 21a of the Free-Form-Surface prism 21 and by hooking the claw portions at the extreme ends of the locking claw portions 24c to the edges of the second spot facing grooves 21h.

In this case, the cabinet 24 is positioned with respect to the Free-Form-Surface prism 21 by projecting bosses from ones of the mounting portions 23 disposed to the Free-Form-Surface prism 21 and the mounting surfaces 24a disposed to the cabinet 24, by forming positioning recessed portions to the others of them, and by fitting the bosses into the positioning recessed portions.

Otherwise, the cabinet 24 may be positioned with respect to the Free-Form-Surface prism 21 by fitting the locking claw portions 24c into the first spot facing grooves 21g. Otherwise, abutting surfaces may be formed separately to at least ones of the mounting portions 23 disposed to the Free-Form-Surface prism 21 and the mounting surfaces 24a formed to the cabinet 24, and the cabinet 24 may be positioned to the Free-Form-Surface prism 21 through the abutting surfaces.

As described above, according to this embodiment, since the cabinet 24 can be coupled with and fixed to the Free-Form-Surface prism 21 by touching them once, they can be assembled easily and the number of manufacturing man-hours can be reduced.

Further, since tightening members such as screws, or the like are not necessary in assembly, the number of parts can be reduced. Further, since the tightening members are not necessary, a torque management is not necessary in a tightening operation, thereby the efficiency of an assembly job can be improved.

Figure 22:
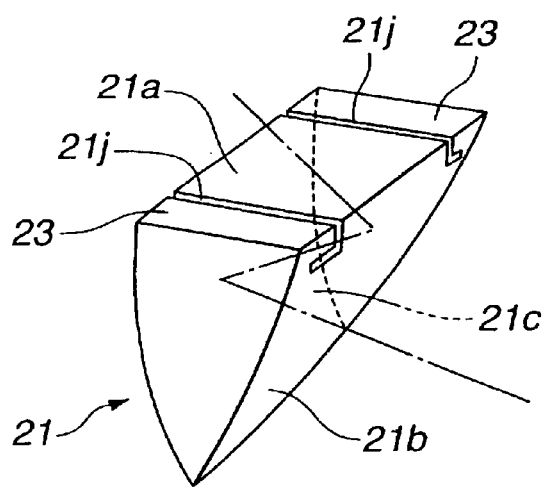
FIG. 22 is a perspective view of a Free-Form-Surface prism of a ninth embodiment.
Figure 23:
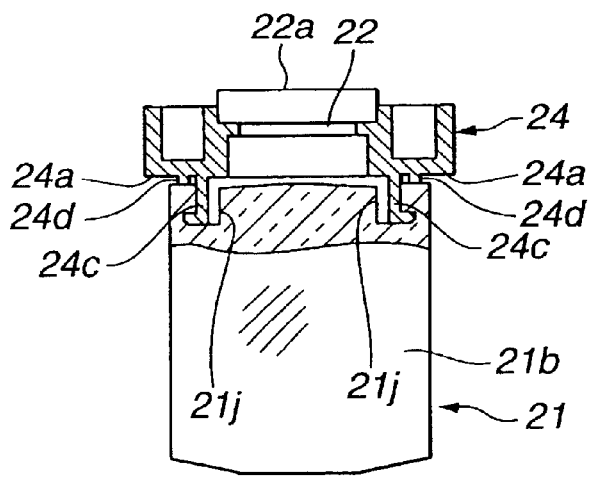
FIG. 23 is a front elevational view of, partly in cross section, of the Free-Form-Surface prism fixed to a cabinet.

Further, FIGS. 22 and 23 show a ninth embodiment of the present invention. Here, FIG. 22 is a perspective view of a Free-Form-Surface prism, and FIG. 23 is a front elevational view, partly in cross section, of the state in which the Free-Form-Surface prism is fixed to the cabinet.

In this embodiment, slits 21j acting as grooves are formed on the border lines between the ineffective light beam ranges formed on both the sides of the first optical surface 21a of the Free-Form-Surface prism 21 and the effective light beam range (refer to FIG. 10B) or formed to sides slightly near to the ineffective light beam ranges from the border lines, and L-shaped cuts are formed to the deepest portions of the slits 21j in directions toward the side surfaces 21d.

The slits 21j are formed at the time the Free-Form-Surface prism 21 is injection molded. A metal mold used in the injection molding is arranged such that it is divided in the directions of the second optical surface 21b and the reflection optical surface 21c of the Free-Form-Surface prism 21, and the slits 21j are formed along mold dividing directions.

Note that since the arrangement of the cabinet 24 on which the Free-Form-Surface prism 21 is mounted is the same as the eight embodiment described above, the description of it is omitted.

In this arrangement, since the slits 21j are formed in the mold dividing directions of the molding metal mold, the mounting portions 23 can be formed with a pinpoint accuracy without making the shape of the Free-Form-Surface prism 21 complex.

Figure 24:
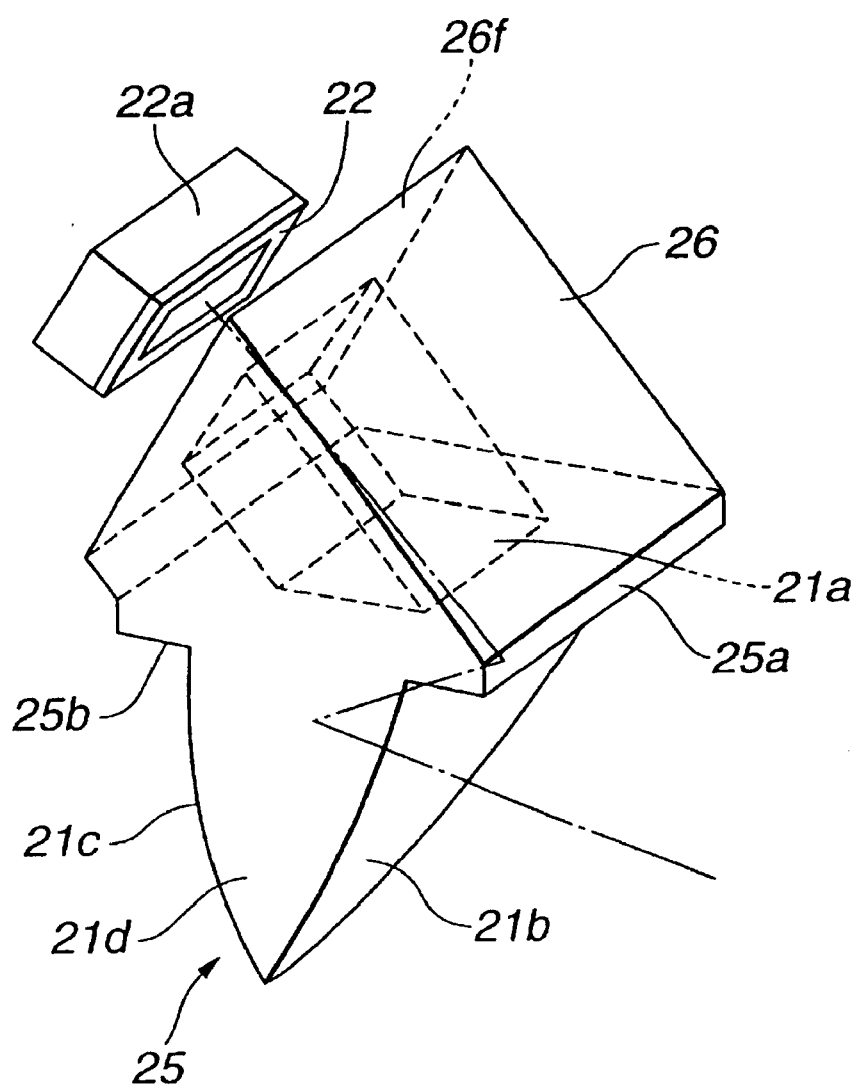
FIG. 24 is a perspective view of a Free-Form-Surface prism of a tenth embodiment.

Further, FIG. 24 shows a perspective view of a Free-Form-Surface prism of a tenth embodiment of the present invention.

The Free-Form-Surface prism 25 shown in this embodiment is arranged such that flange portions 25a and 25b are formed from the first optical surface 21a in the direction of the second optical surface 21b and in the direction of the reflection optical surface 21c, an ineffective light beam range is formed around the effective light beam range (refer to FIG. 10B) of the first optical surface 21a, a cylindrical spacer portion 26 extending from the ineffective light beam range in the direction of image display element 22 is formed integrally with the Free-Form-Surface prism 25, and the image display element 22 is directly fixed to the end surface 26f of the spacer portion 26.

According to this arrangement, since the image display element 22 is directly attached to the spacer portion 26 formed integrally with the Free-Form-Surface prism 25, the positional relation between the image display element 22 and the first optical surface 21a of the Free-Form-Surface prism 25 is maintained constant at all time, thereby excellent optical characteristics can be obtained.

Further, since the space from the image display element 22 to the first optical surface 21a is approximately hermetically sealed by the cylindrically formed spacer portion 26, it is possible to prevent dust from entering the space and attaching thereto.

Note that, in this case, the flange portions 25a and 25b may be formed in parallel with an optical axis outgoing from the second optical surface 21b. With this arrangement, a positional adjustment can be easily executed in assembly.

Figure 25:
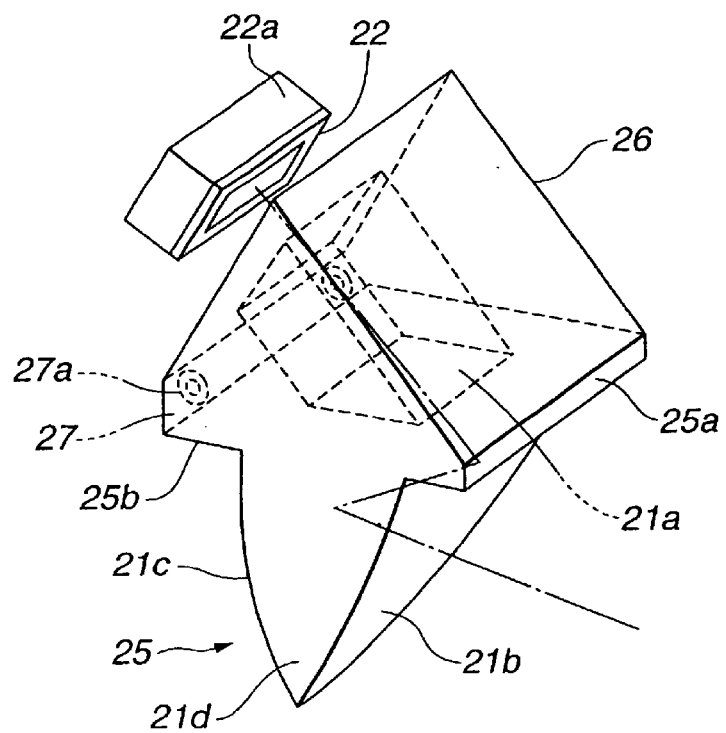
FIG. 25 is a perspective view of a Free-Form-Surface prism of an eleventh embodiment.

Further, FIG. 25 shows a perspective view of a Free-Form-Surface prism of an eleventh embodiment of the present invention. This arrangement is a modified example of the tenth embodiment described above and shows a mode in which a mounting portion 27 is formed to the spacer portion 26.

The mounting portion 27 is formed on the end surface of the flange portion 25b extending from the first optical surface 21a to the reflection optical surface 21c side, and screw holes 27a are threaded into the mounting portion 27.

With this arrangement, the Free-Form-Surface prism 25 is fixed to the not shown cabinet by abutting the mounting portion 27 formed to the Free-Form-Surface prism 25 against the cabinet and by driving the screws having been inserted from the screw insertion holes drilled through the cabinet into the screw holes 27a threaded into the mounting portion 27.

Figure 26:
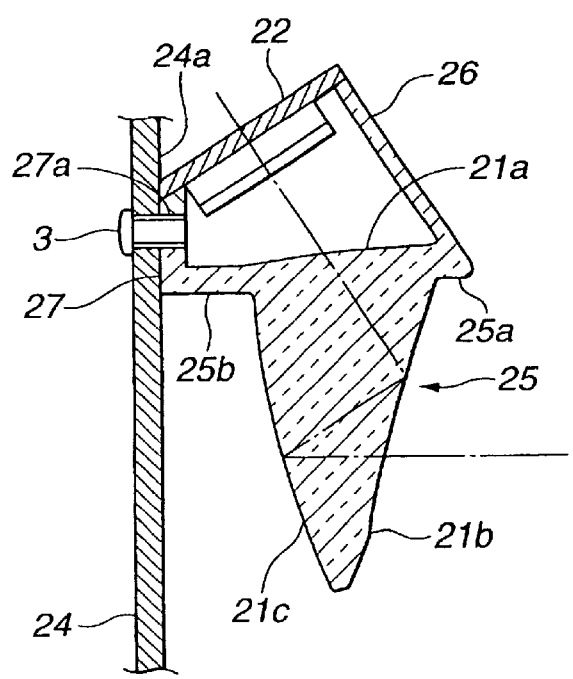
FIG. 26 is a perspective view of a Free-Form-Surface prism of a modified example of FIG. 25.

In this case, the mounting portion 27 can be easily positioned with respect to the mounting surfaces 24a of the cabinet 24 by arranging the mounting portion 27 as a plane perpendicular to the optical axis outgoing from the second optical surface 21b as shown in FIG. 26.

Figure 27:
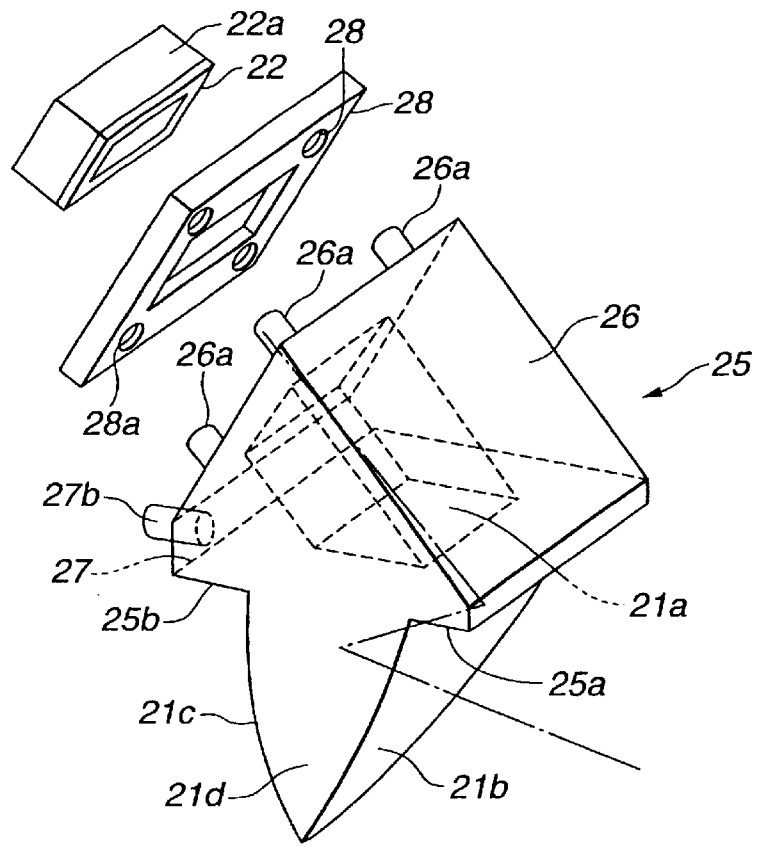
FIG. 27 is a perspective view of a Free-Form-Surface prism of a twelfth embodiment.
Figure 28:
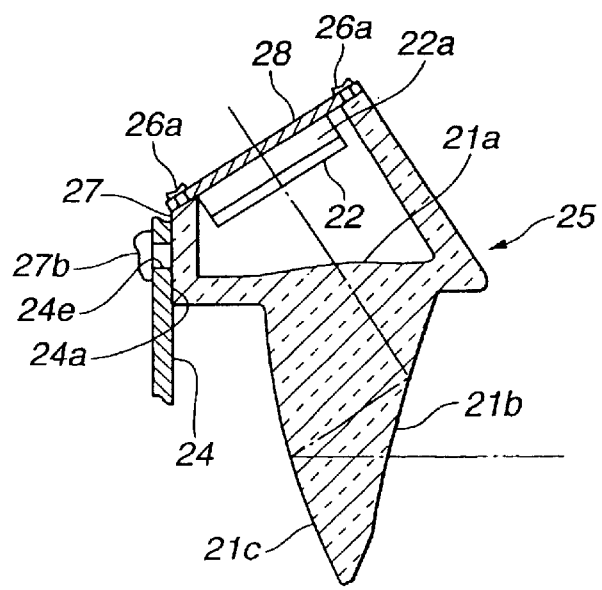
FIG. 28 is a sectional view of the Free-Form-Surface prism

Further, FIGS. 27 and 28 show a twelfth embodiment of the present invention. Here, FIG. 27 is a perspective view of a Free-Form-Surface prism, and FIG. 28 is sectional view of the Free-Form-Surface prism.

This embodiment is a modified example of the eleventh embodiment described above, wherein positioning pins 26a and 27b project from the end surface of the cylindrically formed spacer portion 26 and from the mounting portion 27.

Further, fitting hole portions 28a are drilled through an element holding member 28, to which the image display element 22 is previously fixed, at the positions thereof corresponding to the positioning pins 26a, whereas fitting hole portions 24e are drilled into the mounting surface 24a of the cabinet 24, to which the mounting portion 25c is abutted, at the positions thereof corresponding to the positioning pins 27b.

According to this arrangement, the element holding member 28 is positioned by assembling the fitting hole portions 28a drilled through the element holding member 28, to which the image display element 22 is previously fixed, to the positioning pins 26a projecting from the end surface of the spacer portion 26 formed integrally with the Free-Form-Surface prism 25.

Thereafter, the element holding member 28 is fixed to the spacer portion 26 by heating and thermally welding the positioning pins 26a projecting from the back surface of the element holding member 28.

Further, the cabinet 24 is positioned with respect to the Free-Form-Surface prism 25 by assembling the positioning pins 27b projecting from the mounting portion 25c of the Free-Form-Surface prism 25 to the fitting hole portions 24e drilled into the mounting surfaces 24a of the cabinet 24.

Thereafter, the Free-Form-Surface prism 25 is fixed to the cabinet 24 by heating and thermally welding the positioning pins 27b projecting from the back surface of the cabinet 24.

As described above, in this embodiment, since the respective parts are thermally welded by heating the positioning pins 26a and 27b, assembly can be easily executed and the efficiency of a job can be improved. Note that, in this case, since the positioning pins 26a and 27b are formed at positions that are sufficiently apart from optically acting surfaces, the optical performance is not adversely affected by the positioning pins 26a and 27b even if they are heated.

Figure 29:
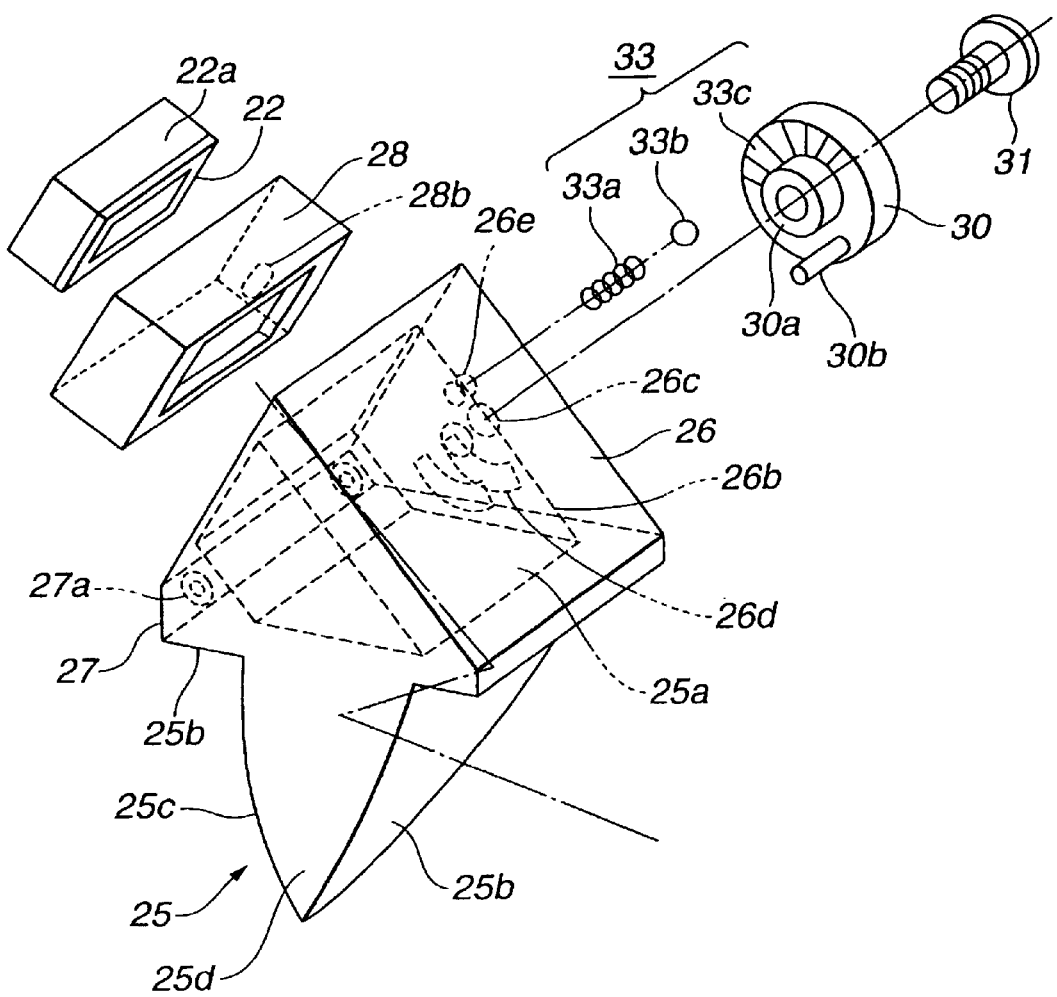
FIG. 29 is a schematic exploded perspective view of an optical system including a Free-Form-Surface prism according to a thirteenth embodiment as a min component thereof.
Figure 30:
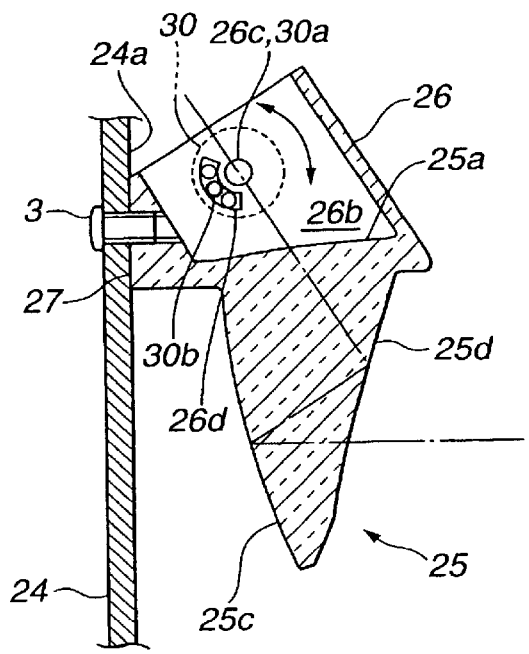
FIG. 30 is a sectional view of the Free-Form-Surface prism.
Figure 31:
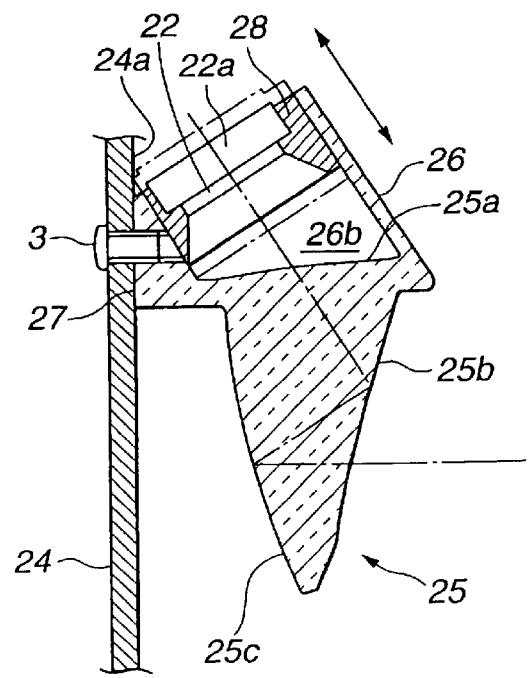
FIG. 31 is a sectional view showing the state in which an element holding member is attached to the Free-Form-Surface prism.

Further, FIGS. 29 to 31 show a thirteenth embodiment of the present invention. Here, FIG. 29 is a schematic exploded perspective view of an optical system including a Free-Form-Surface prism as a main component thereof, FIG. 30 is a sectional view of the Free-Form-Surface prism, and FIG. 31 is a sectional view showing the state in which the element holding member is attached to the Free-Form-Surface prism.

In this embodiment, a diopter scale can be adjusted by forming the inner wall 26b of the spacer portion 26 formed integrally with the Free-Form-Surface prism 25 along a preset optical axis that connects the image display element 22 to the first optical surface 21a as well as by forming the inside dimension of the inner wall 26b to such a size as to permit the element holding member 28, which holds the image display element 22, to be slidably fit to the inner wall 26b through the outside dimension thereof, and by moving the element holding member 28 forward and backward along the inner wall 26b.

That is, a support hole 26c is drilled into one side surface of the spacer portion 26 (on a side surface 25d side in FIG. 29), the shaft portion 30a of a dial type knob 30 is inserted into the support hole 26c as well as a screw 31 inserted through the shaft portion 30a from the outside is driven into the spacer portion 26, thereby the dial type knob 30 is rotatably supported by the side surface of the spacer portion 26.

Further, a pin 30b projects from the dial type knob 30 at a position spaced apart from the shaft portion 30a by a predetermined distance, and an arc-shaped guide hole 26d is drilled into the spacer portion 26 to permit the pin 30b to swing therein. In contrast, a groove portion 28b, into which the pin 30b is inserted, is formed on a side surface of the element holding member 28 laterally long.

Further, a click mechanism 33 is interposed between the inner surface of the dial type knob 30 and the side surface of the spacer portion 26 confronting the inner surface. The click mechanism 33 includes a compressed spring 33a attached to a recessed portion 26e formed to the spacer portion 26 and a click ball 33b supported by the compressed spring 33a, and a plurality of click grooves 33c, which are free to fit to the click ball 33b, are radially formed on the inner surface of the dial type knob 30.

With this arrangement, when the dial type knob 30 rotatably attached to the one side surface of the spacer portion 26 is rotated, the pin 30b projecting from the dial type knob 30 is swung. When the dial type knob 30 is rotated, the pin 30b presses the groove portion 28b, which is formed on the element holding member 28 laterally long, in a swing direction because the extreme end of the pin 30b is inserted into the groove portion 28b.

As a result, the element holding member 28 moves along the inner wall 26b of the spacer portion 26 and varies the relative position between the image display element 22 and the first optical surface 21a, thereby the diopter scale is adjusted.

Further, when the dial type knob 30 is rotated, a feeling of moderation is caused by the click mechanism 33 interposed between the dial type knob 30 and the side surface of the spacer portion 26, and a position after the dial type knob 30 has been rotated is kept by the click mechanism 33, in addition to the feeling of moderation.

As described above, in this embodiment, since the image display element 22 can be moved along the optical axis, the diopter scale can be adjusted after the Free-Form-Surface prism 25 is assembled, and thus it can be conveniently used. Further, good operability can be obtained because the rotating angle of the dial type knob 30 can be positioned stepwise using the click mechanism 33.

It should be noted that, in this case, a projecting portion may be formed to one of, for example, the inner wall 26b of the spacer portion 26 and the outer wall of the element holding member 28 and a guide groove portion that is swingably fitted to projecting portion may be formed to the other of them so that the element holding member 28 is moved forward a backward along the optical axis direction through the projecting portion splined to the guide groove portion.

It is not necessary to cause the overall outer wall of the element holding member 28 to be in sliding contact with the inner wall 26b of the spacer portion 26 because the inner wall 26b of the spacer portion 26 is splined to the outer wall of the element holding member 28. Thus, molding can be easily executed as well as a sliding resistance is reduced.

Note that, at this time, the same effect can be obtained even if only the projecting portion is disposed to one of the inner wall 26b of the spacer portion 26 and the outer wall of the element holding member 28 and the surface of the other of them, on which the projecting portion slides and to which it is fitted, is not formed in a groove shape and is arranged to secure only a surface accuracy. Further, the element holding member 28 may be moved forward and backward along the optical axis by causing the inner side surface of the element holding member 28 to be in sliding contact with the outer wall surface of the spacer portion 26.

Figure 32:
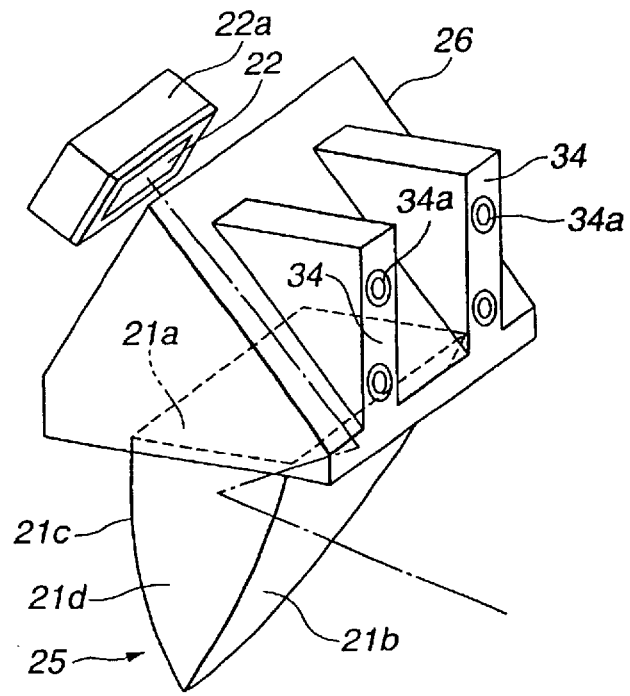
FIG. 32 is a perspective view of a Free-Form-Surface prism of a fourteenth embodiment.

Further, FIG. 32 shows a perspective view of a Free-Form-Surface prism of a fifteenth embodiment of the present invention.

In this embodiment, a pair of mounting portions 34, which are parallel with each other and extend upward in FIG. 32 with a predetermined interval defined therebetween, are formed on the surface of the spacer portion 26, which is formed integrally with the Free-Form-Surface prism 25, on the second optical surface 21b side thereof, and the mounting surfaces of the mounting portions 34 extend in a direction perpendicular to the optical axis outgoing from the second optical surface 21b. Note that, reference numeral 34b denotes mounting screw holes drilled into mounting surfaces.

Figure 33:
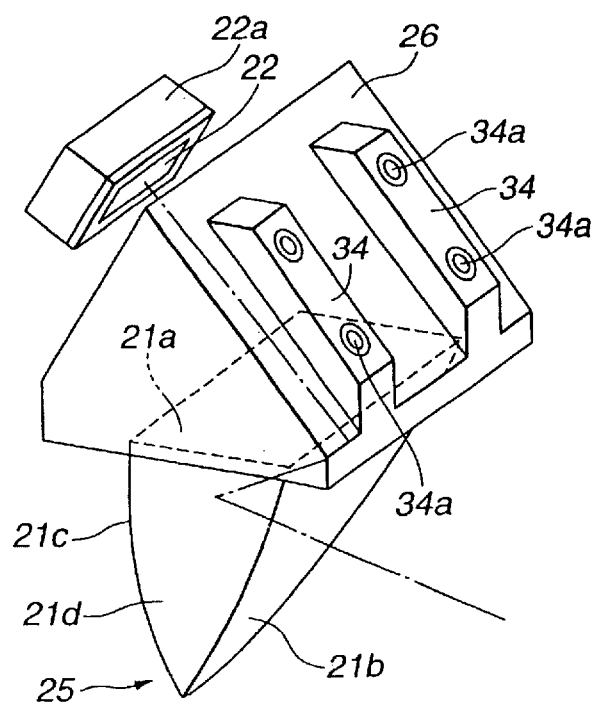
FIG. 33 is a perspective view of a Free-Form-Surface prism of a modified example of FIG. 32.

Further, in this case, the pair of the mounting portions 34 that are parallel with each other may be extended in a direction along the optical axis connecting the image display element 22 to the first optical surface 21a as shown in a modified example of FIG. 33.

Figure 34:
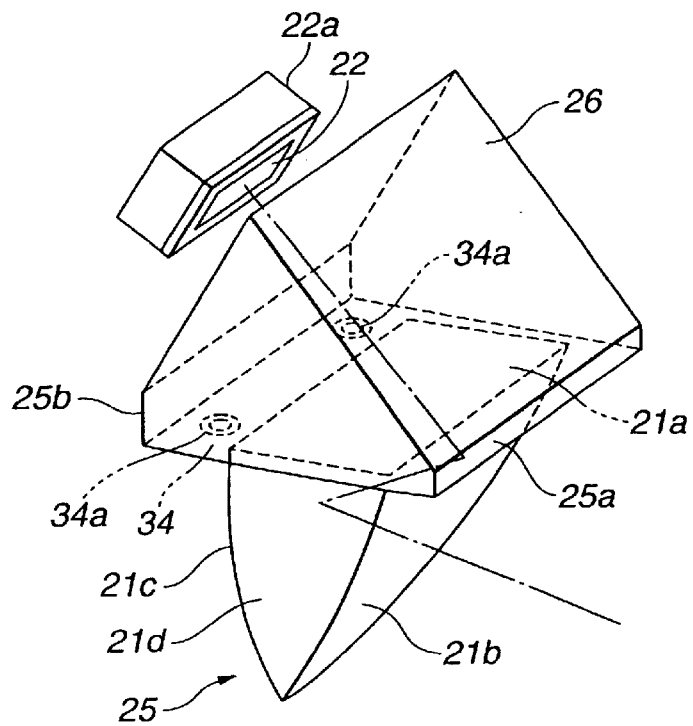
FIG. 34 is a perspective view of a Free-Form-Surface prism of a fifteenth embodiment.

Further, FIG. 34 shows a perspective view of a Free-Form-Surface prism according to a fifteenth embodiment of the present invention.

In this embodiment, the mounting portion 34 is formed on the bottom surface of the flange portion 25b that forms the bottom portion of the spacer portion 26 and extends from the first optical surface 21a to the reflection optical surface 21c side.

In this case, the mounting portion 34 may be formed on the bottom surface of the flange portion 25a which forms the bottom portion of the spacer portion 26 and extends in the direction of the second optical surface 21b from the first optical surface 21a (not to the reflection optical surface 21c side but to the opposite side thereof). Further, when the Free-Form-Surface prism is mounted, the position thereof can be easily adjusted by forming the mounting portion 34 in parallel with the optical axis outgoing from the second optical surface 21b.

Figure 35:
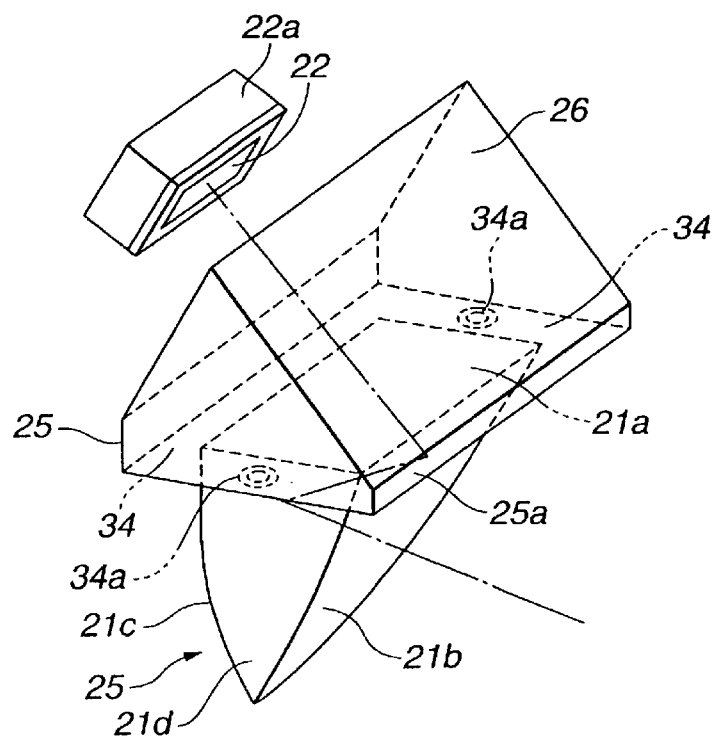
FIG. 35 is a perspective view of a Free-Form-Surface prism of a sixteenth embodiment.

Further, FIG. 35 shows a perspective view of a Free-Form-Surface prism of a sixteenth embodiment of the present invention.

The mounting portion 34 is formed on the bottom surface of the flange portion 25b extending from the first optical surface 21a to the reflection optical surface 21c side in the fifteenth embodiment described above. In this embodiment, however, the mounting portions 34 are formed on the bottom surface of the flange portion that forms the bottom portion of the spacer portion 26 and extends from the first optical surface 21a in the direction of both the side surfaces 21d.

In this case, when Free-Form-Surface prism is mounted, it can be easily positioned by forming the mounting portions 34 in parallel with the optical axis outgoing from the second optical surface 21b.

Further, FIG. 36 shows a perspective view of a Free-Form-Surface prism of a seventeenth embodiment of the present invention.

This embodiment corresponds to a modified example of the sixth embodiment (refer to FIG. 17) described above. That is, in the sixth embodiment, the pair of mounting portions 23, which are parallel with each other, are extended from both the edge portions of the first optical surface 21a on the reflection optical surface 21c side thereof in the ineffective light beam range. In this embodiment, however, the mounting portions 23 extend upward perpendicularly to the first optical surface 21a from both the edge portions of the reflection optical surface 21c on the first optical surface 21a side thereof in the ineffective light beam range of the reflection optical surface 21c and can obtain the same operation/working effect as the sixth embodiment.

Further, FIG. 37 shows a perspective view of a Free-Form-Surface prism according to an eighteenth embodiment of the present invention.

This embodiment corresponds to a modified example of the third embodiment (refer to FIG. 14) described above.

That is, in the third embodiment, the pair of mounting portions 23, which are parallel with each other, are formed on the upper surface of the first optical surface 21a like the bridge beams. In this embodiment, however, mounting portions 36 project from the end edges of the first optical surface 21a on the reflection optical surface 21c side thereof in parallel with the optical axis outgoing from the second optical surface 21b or in parallel with the first optical surface 21a, and a pair of screw insertion holes 36a are drilled through the mounting portions 36 at a predetermined interval.

Then, the Free-Form-Surface prism 21 is fixed to the cabinet by abutting the upper surfaces or the bottom surfaces of the mounting portions 36 against the mounting surface (not shown) of the cabinet, and driving the screws having been inserted through the insertion holes 36a into the cabinet.

In this case, the mounting portions 36 may be projected in the direction of the second optical surface 21b as in a modified example shown in FIG. 38.

As described above, according to this embodiment, since the mounting portions 36 are projected from the first optical surface 21a in the direction of the reflection optical surface 21c or in the direction of the second optical surface 21b so as not to project from the side surfaces 21d, the space between the Free-Form-Surface prism 21 and the cabinet to which the Free-Form-Surface prism 21 is fixed can be effectively utilized.

Note that while this embodiment is described based on the case in which it is applied to the Free-Form-Surface prism shown in FIG. 9, it can be embodied also in the Free-Form-Surface prism as shown in FIG. 11 likewise.

As described above, since the mounting portions for fixing the element project from the side surfaces that do not contribute to the optical action, a structure san be simplified and moreover the space can be effectively utilized, thereby the device can be reduced in size in its entirety.

Further, since the optical element can be fixed to the cabinet without the occurrence of harmful strain, no internal stress is caused in the optical element, thereby the optical characteristics can be guaranteed for a long period of time.

Next, an embodiment of a video display device having an image observation device that positions or hold a (deflected) Free-Form-Surface prism using the ridge line or apex of the prism as a reference.

First, a video display device of a first embodiment of the present invention having an image observation device of a second embodiment with respect to FIGS. 39–44.

Figure 39:
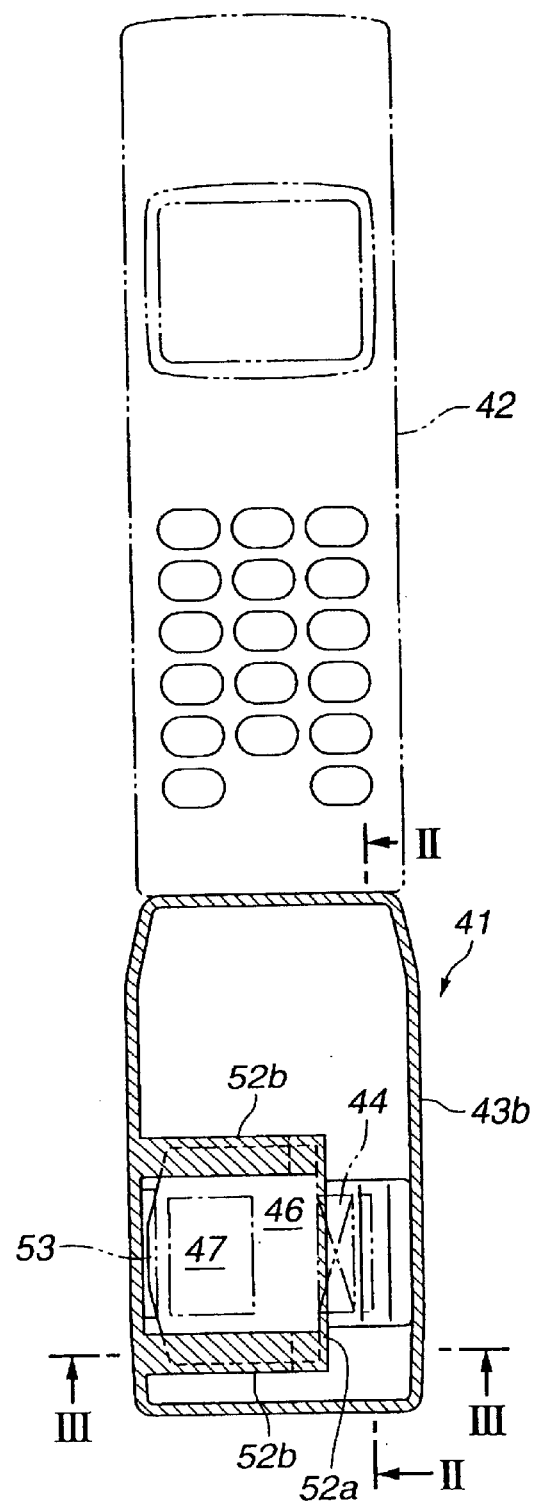
FIG. 39 is a sectional front elevational view of a video display device of the first embodiment including an image observation device of the second embodiment.
Figure 40:
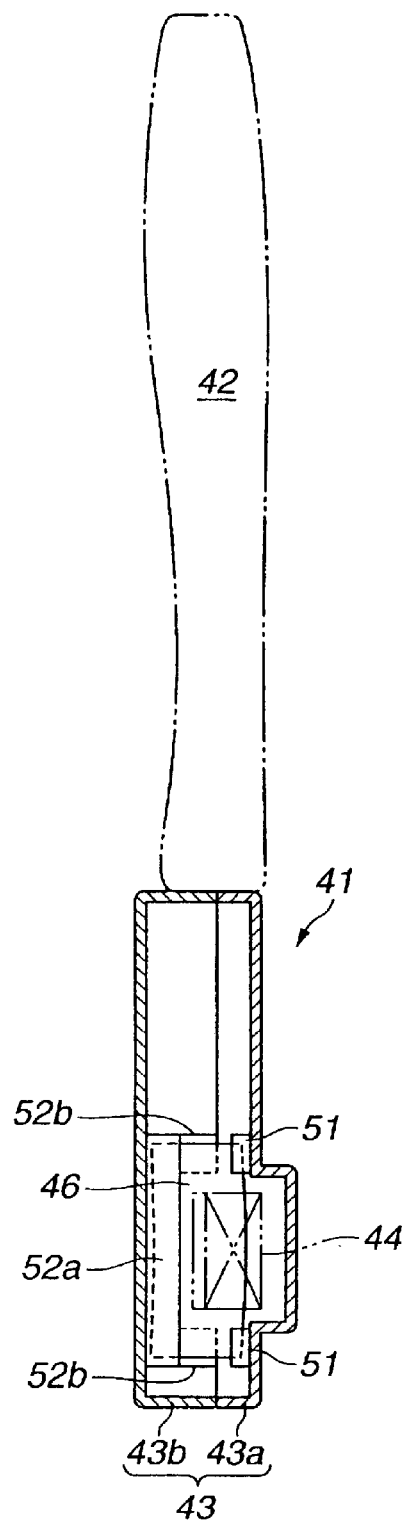
FIG. 40 is a II—II sectional view of FIG. 39.
Figure 41:
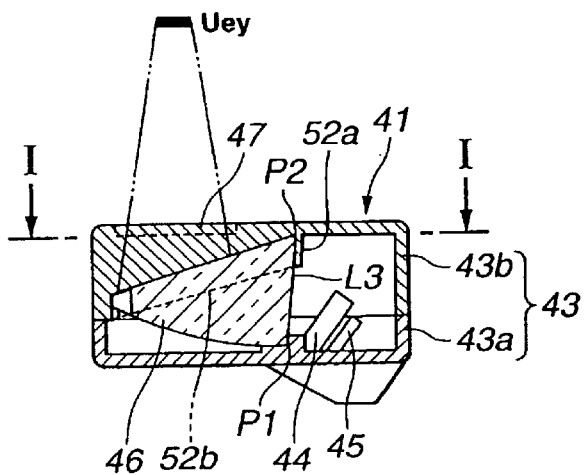
FIG. 41 is a III—III sectional view of FIG. 39, FIGS. 42A, 42B, and 43C are plan view, a side elevational view, and a rear elevational view of a Free-Form-Surface prism, respectively.

Reference numeral 41 in FIGS. 39–41 denotes the video display device which is disposed to a portable terminal 42. Note that a portable phone, a mobile device, or the like are available as the portable terminal 42, the portable phone is exemplified in this embodiment as an example of the portable terminal 42. Thus, the portable terminal 42 will be explained as the portable phone 42 in the following description.

A video display element 44 for displaying an image, a Free-Form-Surface prism 46 for enlarging the image displayed on the video display element 44, or the like are contained in a cabinet 43 acting as an exterior member of the image observation device of the second embodiment fixed on the bottom surface of the portable phone 42.

Note that the video display element 44 may be an electronic luminescent (EL) element, a plasma display, a light emitting diode (LED) array, or the like, in addition to a liquid crystal display element. However, since the liquid crystal display element is employed in this embodiment, an illumination element 45 is disposed on the back surface of the liquid crystal display element so that an image displayed thereon can be observed with sufficient brightness. Further, an observation window 47 is disposed in front of the cabinet 43 so that the image displayed on the video display element 44 and enlarged by the Free-Form-Surface prism 46 outgoes therefrom.

Figure 42A:
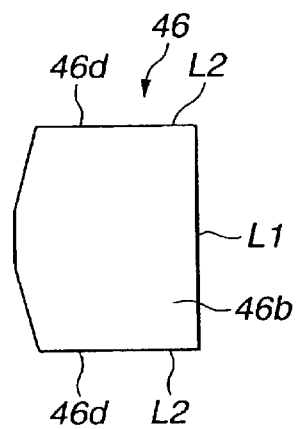
Figure 42C:
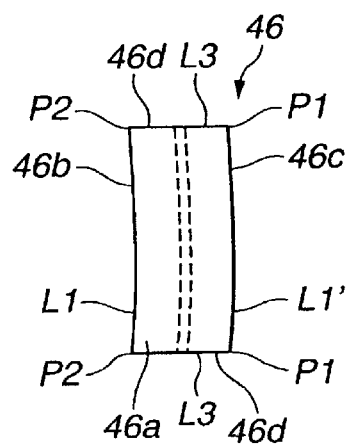
Figure 42B:
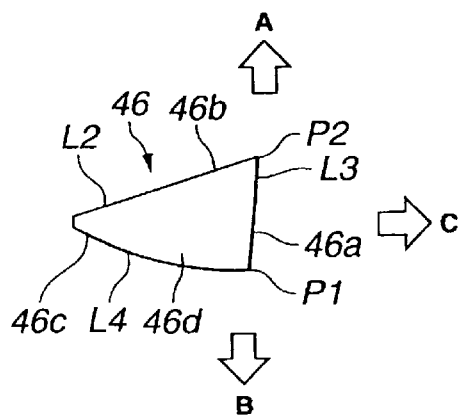

As shown in FIGS. 42A–42C, the Free-Form-Surface prism 46 is a plastic molded member and has three optical surfaces 46a–46c, that is, the first optical surface 46a, the second optical surface 46b, and the third optical surface 46c that execute an optical action as a whole and has a pair of parallel side surfaces 46d that confront in parallel each other and do not contribute to the optical action (reflecting and refracting actions). The first optical surface 46a acting as a light incident surface is composed of a flat surface or a curved surface such as a spherical surface, an aspherical surface or the like, the second optical surface 46b acting as a reflecting and refracting surface is composed of a spherical surface or a toric surface partly making use of total reflection, and the third optical surface 46c is composed of a semi-transmitting or mirror-reflecting rotation asymmetrical aspherical surface, or the like having a different curvature depending upon an azimuth angle, that is, composed of a surface shape which is plane symmetrical only to one symmetrical surface.

Further, outside ridge lines L1, L1', and L2–L4 are formed by the respective optical surfaces 46a–46c and the side surfaces 46d.

Figure 43:
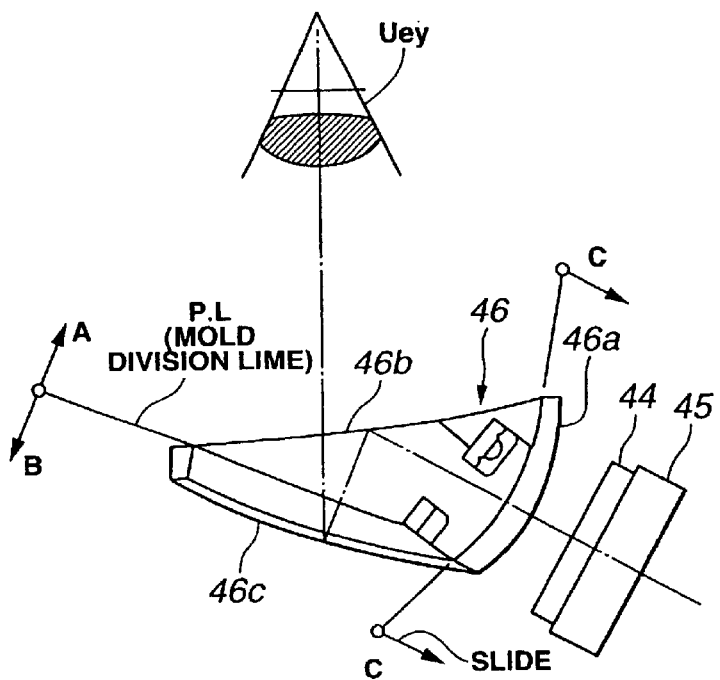
FIG. 43 is an explanatory view when an enlarged view is observed using a Free-Form-Surface prism.

Then, as shown in FIG. 43, when light beams based on the image displayed on the video display element 44 are introduced from the first optical surface 46a of the Free-Form-Surface prism 46 into the inside of the element, they are totally reflected by the second optical surface 46b, reflected and condensed by the third optical surface 46c, transmitted through the second optical surface 46b, and then introduced to the eyeballs Uey of the observer.

At this time, the image displayed on the image display element 44 is not focused in a midway and displayed as an enlarged virtual image in front of the observer depending upon the curvatures of the second optical surface 46b and the third optical surface 46c.

Figure 44:
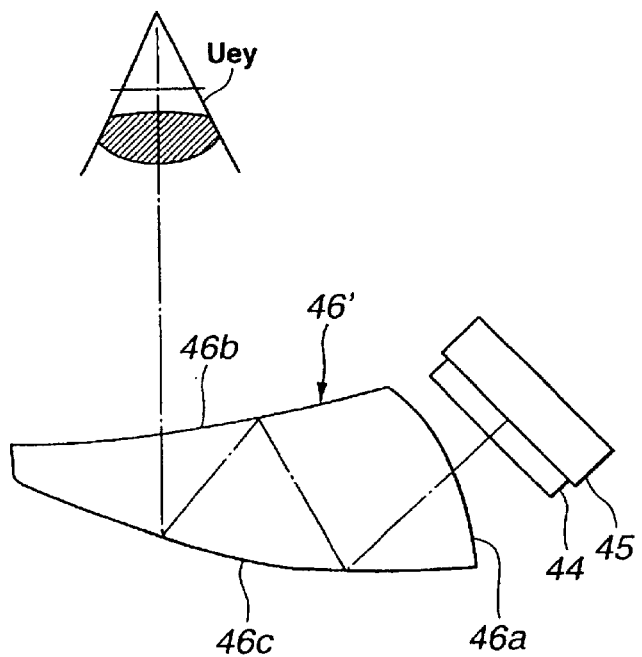
FIG. 44 is an explanatory view when an enlarged view is observed using a Free-Form-Surface prism of a modified example.

In this case, the light beams having been introduced into the inside of the element from the first optical surface 46a may be introduced to the third optical surface 46c and totally reflected thereby once, may be totally reflected by the second optical surface 46b, may be further reflected and condensed by the third optical surface 46c, and then may be introduced to the eyeball Uey of the observer, that is, the light beams may be reflected twice by the third optical surface 46c as in a Free-Form-Surface prism 46' of a modified example shown in FIG. 44.

Incidentally, since the Free-Form-Surface prism 46 has the smaller number of flat surfaces acting as a reference surface, it is difficult to fix the Free-Form-Surface prism 46 to the cabinet 43 in the state in which it is positioned as prescribed. In this embodiment, however, it is possible to position the Free-Form-Surface prism 46 with a pinpoint accuracy by positioning or holding it using outside ridge lines or apexes thereof as a reference while eliminating a positioning portion, which projects from the Free-Form-Surface prism 46, of a conventional example.

In this case, the outside ridge lines or the apexes of the Free-Form-Surface prism 46 that are used for the positioning with respect to the cabinet 43 is determined based on the structure of a metal mold for molding the Free-Form-Surface prism 46.

That is, as shown in FIG. 42B, the Free-Form-Surface prism 46 employed in this embodiment is molded using a metal mold that is divided in three directions of arrows A, B, and C. In FIG. 42B, the mold dividing directions of the arrows A and B are set in the directions along the outside ridge lines L3 formed by the first optical surface 46a and the side surfaces 46d, and the first optical surface 46a is set symmetrical with respect to the mold dividing directions shown by the arrows A and B.

Since the outside ridge lines L3 formed on both the sides of the first optical surface 46a are approximate linear lines and symmetrical with each other, both the outside ridge lines L3 are approximately parallel with each other and an apex P1 approximately agrees with an apex P2 in a height direction. Accordingly, the accuracy of a holding member formed to the cabinet 43 can be easily secured by setting the outside ridge lines L3 or the apexes P1 and P2 thereof as positioning portions with respect to the cabinet 43, thereby it is possible to position the Free-Form-Surface prism 46 with a pinpoint accuracy.

Thus, in this embodiment, the Free-Form-Surface prism 46 is fixed to the cabinet 43 using the outside ridge lines L3 formed on both the sides of the first optical surface 46a and the respective apexes P1 and P2 thereof as a reference.

Specifically, as shown in FIGS. 39–41, the cabinet 43 is divided into a rear case 43a and a front case 43b, and rear apex holding members 51, which position or hold the apex P1 of one of the outside ridge lines L3 of the Free-Form-Surface prism 46, are formed to the rear case 43a integrally therewith.

In contrast, a front apex holding member 52a, which positions or holds the apex P2 of the other of the outside ridge lines L3 of the Free-Form-Surface prism 46, is formed to the front case 43b integrally therewith.

Further, front ridge line holding members 52b are formed to the front case 43b continuous to the front apex holding member 52a to hold the outside ridge lines L2 where the second optical surface 46b intersects the side surfaces 46d (refer to FIGS. 42A and 42B) on both the sides of second optical surface 46b of the Free-Form-Surface prism 46. In addition, an extreme end holding member 53, which has a recessed portion, into which the extreme end portion where the second optical surface 46b and the third optical surface 46c of the Free-Form-Surface prism 46 are converged is fitted, is formed to the front case 43b integrally therewith.

With this arrangement, the outside ridge lines L2, which are formed on both the sides of second optical surface 46b of the Free-Form-Surface prism 46, and the apexes P2, which are formed at both the ends of the outside ridge lines L3 formed on both the sides of the first optical surface 46a, are attached to the front ridge line holding member 52b and the front apex holding member 52a formed to the front case 43b of the cabinet 43. Further, the extreme end portion, where the second optical surface 46b and the third optical surface 46c are converged, is fitted into the recessed portion formed on the extreme end holding member 53. Note that, at this time, the Free-Form-Surface prism 46 may be tentatively attached to the respective holding member 52a, 52b, and 53 using an adhesive, or the like.

Thereafter, when the front case 43b is fitted to the rear case 43a, the apexes P1 formed to the other ends of the outside ridge lines L3 of the Free-Form-Surface prism 46 are fitted to the rear apex holding members 51 formed to the rear case 43a integrally therewith and positioned or held thereby.

As a result, the first optical surface 46a of the Free-Form-Surface prism 46 is positioned by the rear apex holding members 51 and the front apex holding member 52a, and further the outside ridge lines L2 are pressed by the front ridge line holding member 52b and fixed thereby.

As described above, according to this embodiment, the outside ridge lines L3 of the first optical surface 46a, which has been processed with a pinpoint accuracy, of the Free-Form-Surface prism 46 are used as positioning portions with respect to the cabinet 43, and moreover the outside ridge lines L3 are formed approximately linearly along the mold dividing directions of the metal mold as well as formed symmetrically right and left, thereby the height directions of the respective apexes P1 and P2 of both the outside ridge lines L3 are caused to agree with one another. Accordingly, it is possible to form the rear apex holding member 51 and the front apex holding member 52a, which position or hold both the apexes P1 and P2, with a pinpoint accuracy, thereby the Free-Form-Surface prism 46 can be positioned with respect to the cabinet 43 with a pinpoint accuracy.

Further, the apexes P1 and P2 of the outside ridge lines L3 formed on both the sides of the first optical surface 46a of the Free-Form-Surface prism 46 are positioned or held by the respective apex holding members 51 and 52a of the cabinet 43 as well as the extreme end portion is held by the extreme end holding member 53. Thus, the Free-Form-Surface prism 46 is positioned in the cabinet 43 by attaching the front case 43b to the rear case 43a, which permits assembly to be executed easily and the number of man-hours of assembly to be reduced.

Further, since it is not necessary to project a positioning portion from the Free-Form-Surface prism 46 as in the prior example, the manufacture of the Free-Form-Surface prism 46 can be simplified as well as the weight thereof can be reduced.

Further, stress larger than necessary is not applied to the Free-Form-Surface prism 46 because it is not necessary to fix the Free-Form-Surface prism 46 using screws, or the like in assembly. As a result, not only optical characteristics are not deteriorated, quality in assembly is improved and the reliability of a product is enhanced but also the number of parts is reduced because screws or the like are not necessary and further the size and weight of the device can be reduced as a whole.

Figure 45:
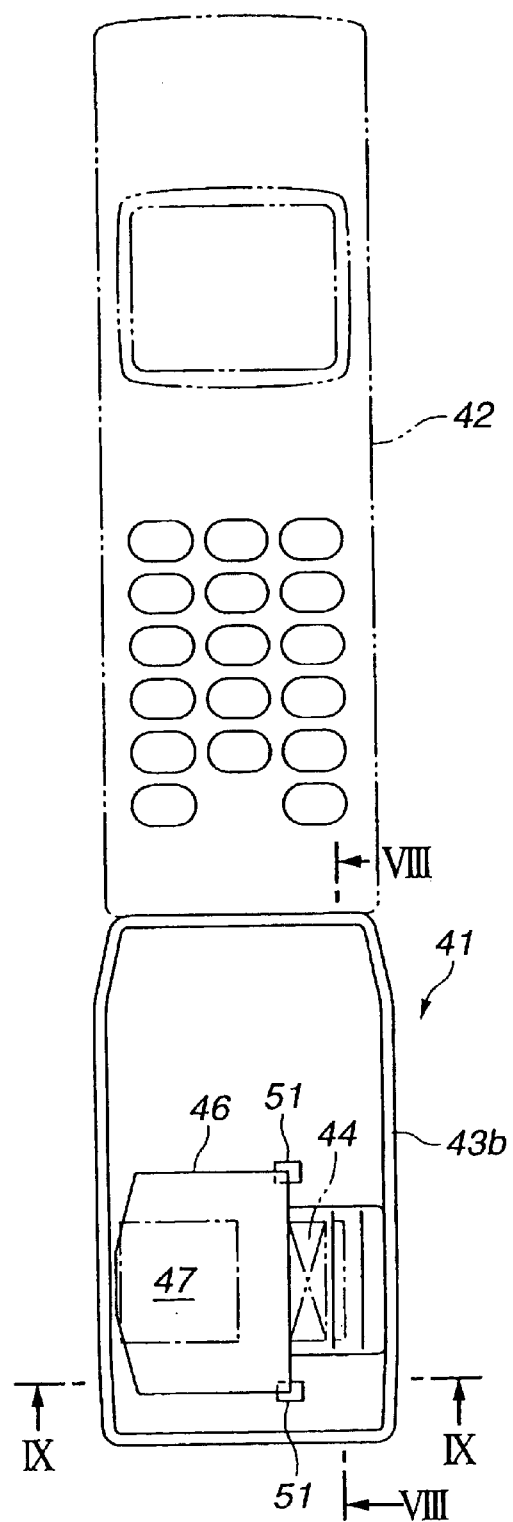
FIG. 45 is a front elevational view of a video display device of the second embodiment from which a front case is removed.
Figure 46:
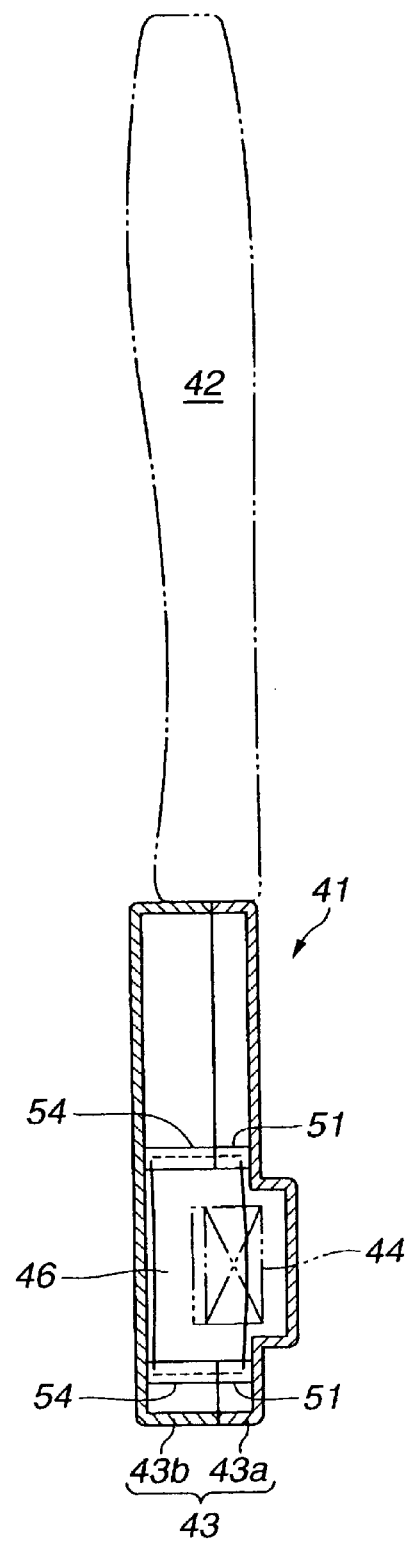
FIG. 46 is an VIII—VIII sectional view of FIG. 45.
Figure 47:
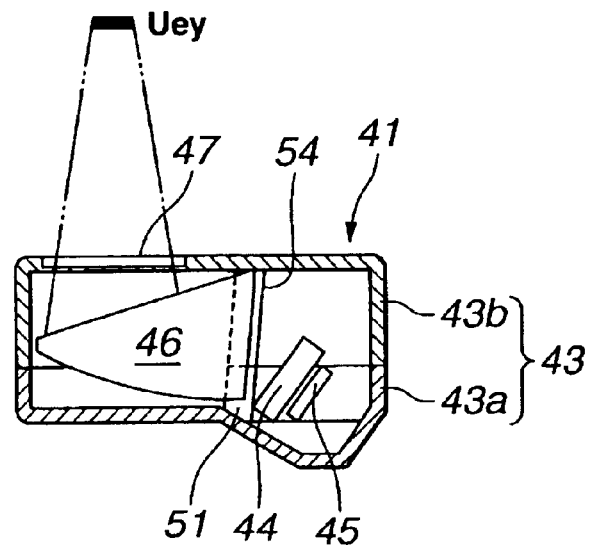
FIG. 47 is a IX—IX sectional view of FIG. 45.

Next, a video display device of a second embodiment (video observation device of a third embodiment) will be described with reference to FIGS. 45–47.

This embodiment is arranged such that the rear apex holding members 51, which receive the apexes P1 of the outside ridge lines L3 formed on both the sides of the first optical surface 46a of the Free-Form-Surface prism 46 shown in the first embodiment (refer to FIGS. 42B and 42C), are formed on the inner surface of the rear case 43a integrally therewith, whereas front holding members 54, which receive the other apexes P2 of the outside ridge lines L3, are formed on the inner surface of the front case 43b integrally therewith as well as both the holding members 51 and 54 are extended up to the joint surfaces of the rear case 43a and the front case 43b.

That is, in assembly, the apexes P1 or P2 of the Free-Form-Surface prism 46 are attached to ones of the rear apex holding members 51 formed to the rear case 43a and the front holding members 54 formed to the front case 43b as well as the outside ridge lines L3 connecting between both the apexes P1 and P2 are abutted thereagainst and positioned or held using an adhesive, or the like.

Subsequently, when both the cases 43a and 43b are closed, the apexes P1 and P2, which are disposed to the first optical surface 46a formed to the Free-Form-Surface prism 46 at the four positions thereof, are clamped between the holding members 51 and 54 formed on the inner surfaces of both the cases 43a and 43b and further positioned or held by the outside ridge lines L3.

As described above, according to this embodiment, the apexes P1 and P2, which are disposed to the first optical surface 46a of the Free-Form-Surface prism 46 at the four positions thereof, are clamped between the holding members 51 and 54 projecting from the inner surfaces of the rear case 43a and the front case 43b and fixed thereby as well as the outside ridge lines L3 connecting between both the apexes P1 and P2 are abutted against the inner surfaces of the holding members 51 and 54 and positioned or held thereby. Accordingly, the structure of the Free-Form-Surface prism 46 is more simplified than the first embodiment as well as the the Free-Form-Surface prism 46 can be manufactured and assembled more easily.

Further, since the outside ridge lines L3 of the Free-Form-Surface prism 46 are formed approximately linearly and symmetrically, the Free-Form-Surface prism 46 can be positioned with respect to the holding members 51 and 54 formed to the cabinet 43 with a pinpoint accuracy.

Figure 50:
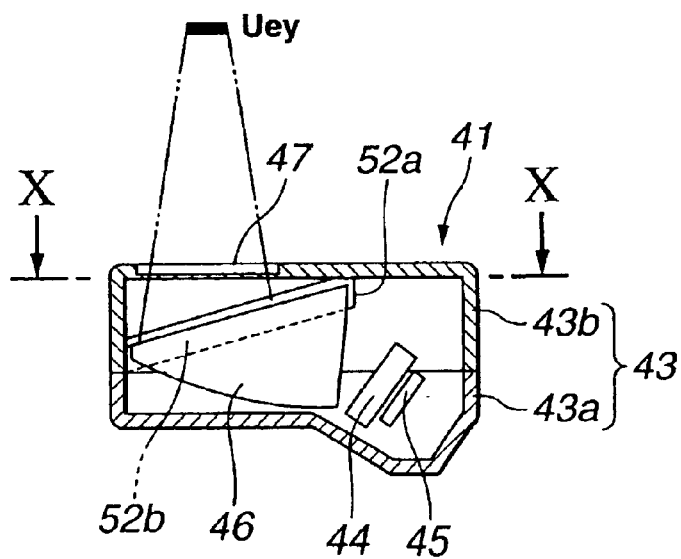
FIG. 50 is a X—X sectional view of FIG. 48.
Figure 48:
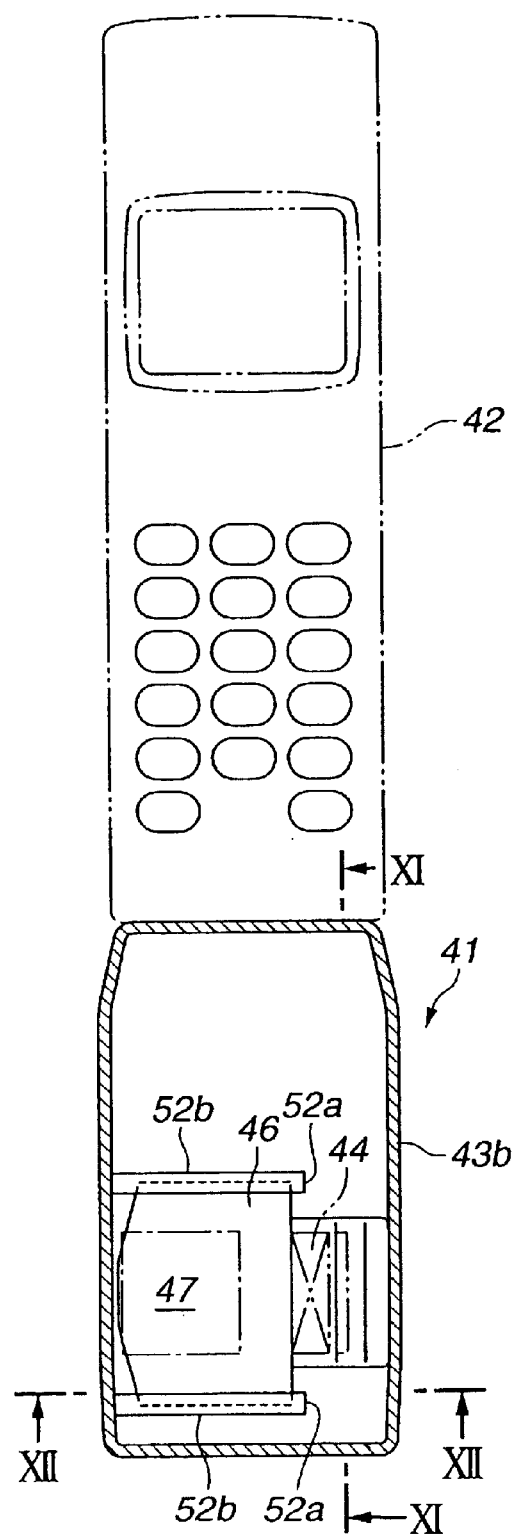
FIG. 48 is a front elevational view corresponding to a XIII—XIII cross section of FIG. 50 in a video display device of the third embodiment.
Figure 49:
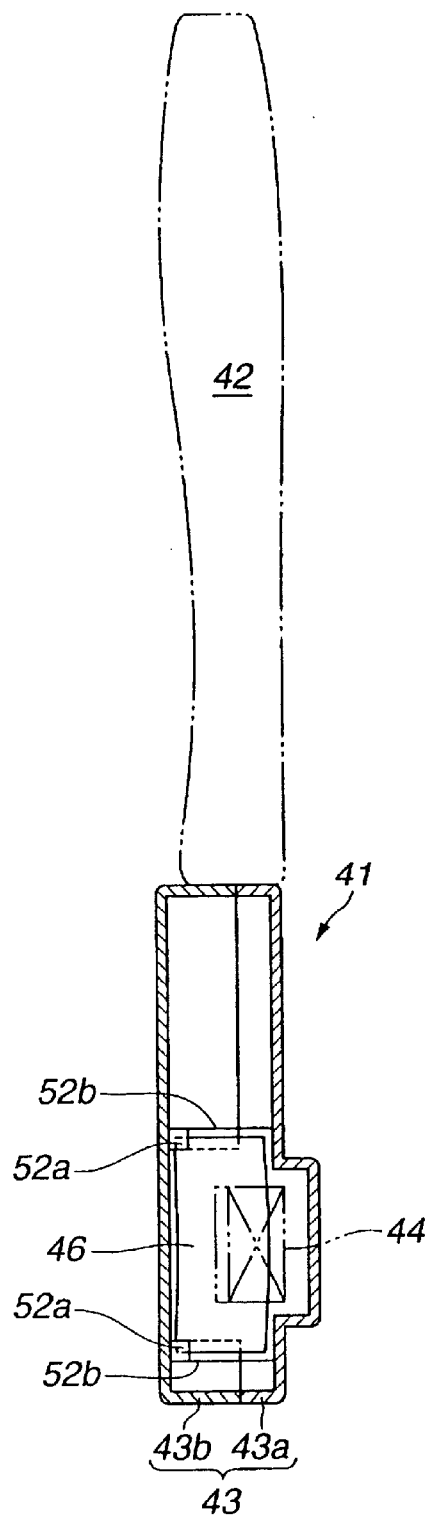
FIG. 49 is an XI—XI sectional view of FIG. 48.

FIGS. 48–50 show a video display device of a third embodiment. Here, FIG. 48 is a front elevational view corresponding to a XIII—XIII cross section of FIG. 50, FIG. 49 is a XI—XI sectional view of FIG. 50, and FIG. 50 is a X—X sectional view of FIG. 48.

In this embodiment, the Free-Form-Surface prism 46 is fixed to the front case 43b in the state in which the outside ridge lines L2 and the apexes P2 of the Free-Form-Surface prism 46 are positioned or held by the front ridge line holding members 52b formed to the front case 43b and by the front apex holding members 52a continuous to the front ridge line holding members 52b.

That is, the front ridge line holding members 52b and the front apex holding members 52a, which position or hold the outside ridge lines L2 of the Free-Form-Surface prism 46 as well as position or hold the apexes P2, are formed on the inner surface of the front case 43b integrally therewith.

Then, in assembly, the outside ridge lines L2 of the Free-Form-Surface prism 46 are attached to the front ridge line holding members 52b formed on the inner surface of the front case 43b as well as the apexes P1 are abutted against the front apex holding members 52a to thereby position or hold them in an up and down direction and in a right and left direction on the sheet of FIG. 48 and fix them using an adhesive, or the like.

As described above, since the Free-Form-Surface prism 46 is poisoned or held by being bonded to the front ridge line holding member 52b and the front apex holding member 52a which are formed to the front case 43b in this embodiment, the Free-Form-Surface prism 46 can be easily manufactured and the assembling property thereof is more improved.

Figure 51:
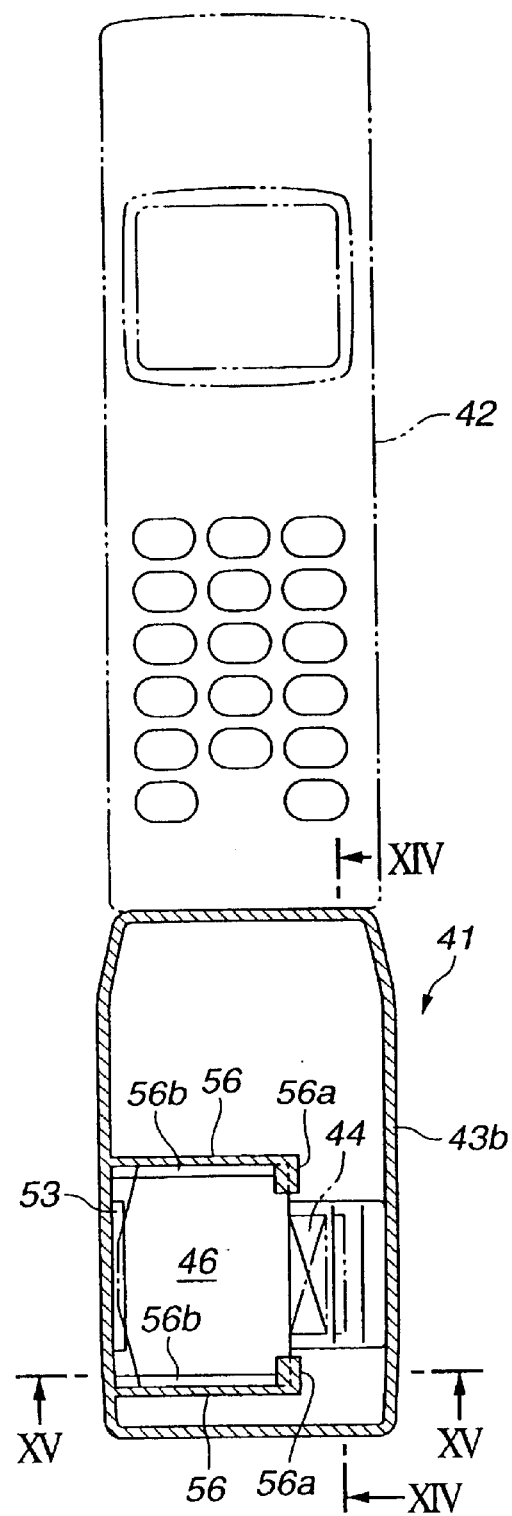
FIG. 51 is a front elevational view corresponding to an XIII—XIII cross section of FIG. 53 in a video display device of the fourth embodiment.
Figure 52:
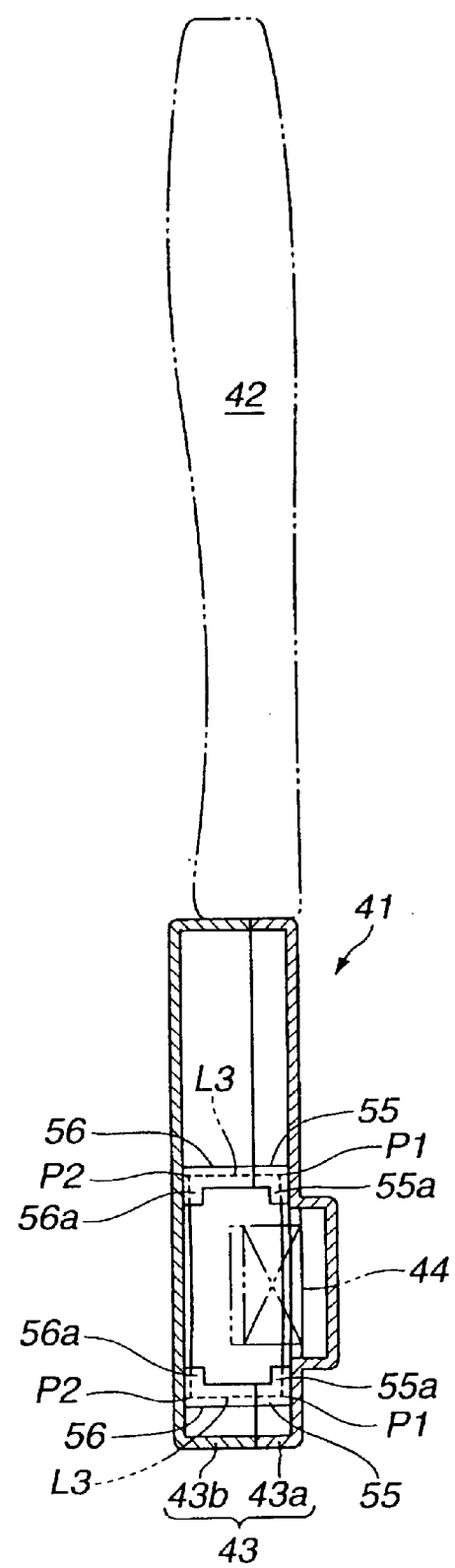
FIG. 52 is a XIV—XIV sectional view of FIG. 51.
Figure 53:
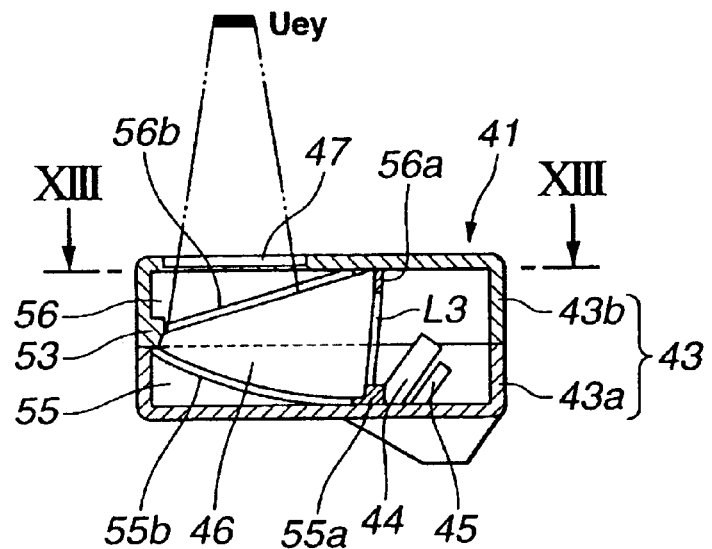
FIG. 53 is a XV—XV sectional view of FIG. 51.

FIGS. 51–53 show a fourth embodiment. Here, FIG. 51 shows a front elevational view corresponding to a XIII—XIII cross section of FIG. 53, FIG. 52 is a XIV—XIV sectional view of FIG. 51, and FIG. 53 is a XV—XV sectional view of FIG. 51.

This embodiment is arranged such that holding members 55 and 56 project from the inner surfaces of the rear case 43a and the front case 43b so as to be abutted against the side surfaces 46d of the Free-Form-Surface prism 46 and position and hold the side surfaces 46d. Further, a rear apex holding member 55a and a front apex holding member 56a project from the confronting surfaces of the respective holding members to hold the apexes P1 and P2 formed to both the ends of the outside ridge lines L3 as well as a flange portion 55b, which is abutted against outside ridge lines L4 formed by intersecting the third optical surface 46c of the Free-Form-Surface prism 46 to the side surfaces 46d thereof, and a flange portion 56b, which is abutted against the outside ridge lines L2 formed by intersecting the second optical surface 46b to the side surfaces 46d, project from the respective holding members 55 and 56 inwardly.

When the rear case 43a and the front case 43b are closed, the apexes P1 and P2, which are formed to both the ends of the side surfaces 46d and the outside ridge lines L3 of the Free-Form-Surface prism 46, and the respective outside ridge lines L2 and L4 are positioned or held by the holding members 55 and 56, the respective apex holding members 55a and 56a, and the flange portions 55b and 56b, which are formed in both the cases 43a and 43b. Further, extreme end portion, where the second optical surface 46b and the third optical surface 46c are converged, is abutted against the extreme end holding member 53 and positioned thereat or held thereby.

As a result, since the Free-Form-Surface prism 46 can be positioned or held only by closing the rear case 43a and the front case 43b without using an adhesive, or the like in this embodiment, the assembling property can be greatly improved. It is needless to say that the Free-Form-Surface prism 46 may be tentatively fixed to one of the cases 43a and 43b using an adhesive in assembly.

Figure 56:
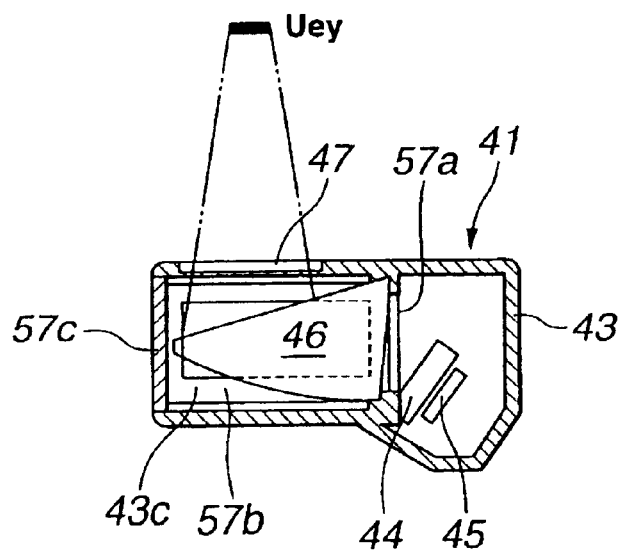
FIG. 56 is an XVIII—XVIII sectional view of FIG. 54.
Figure 54:
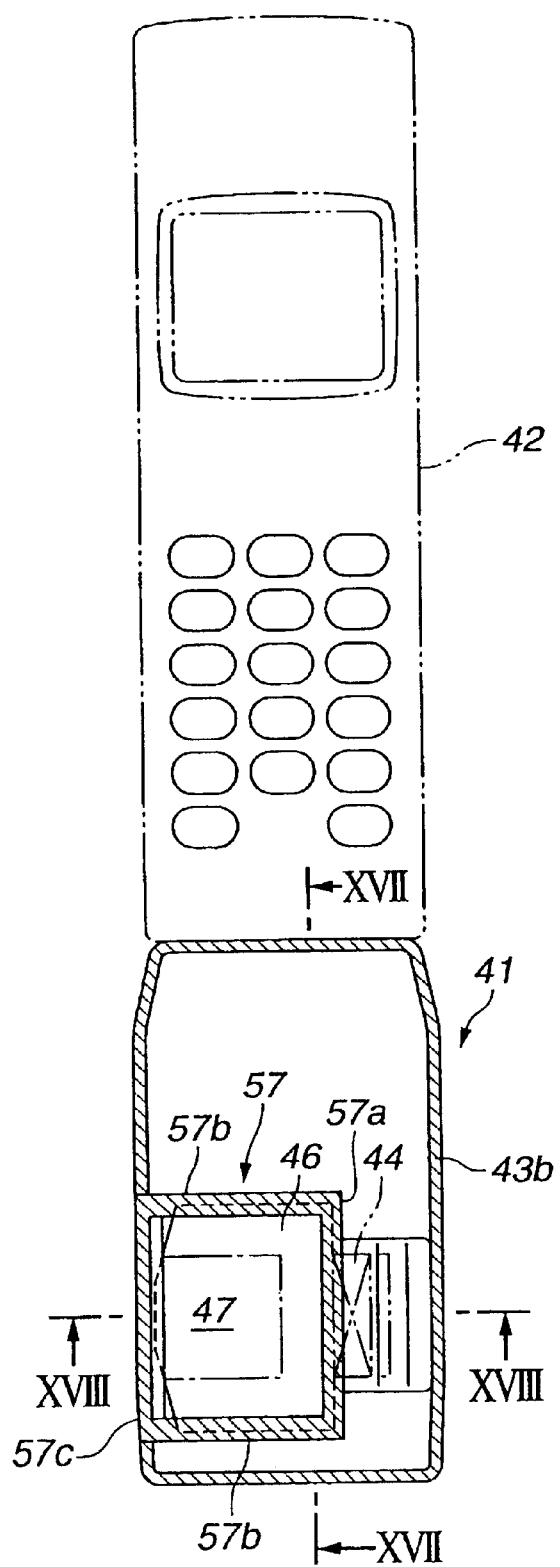
FIG. 54 is a front elevational view corresponding to a XVI—XVI cross section of FIG. 55 in a video display device of the fifth embodiment.
Figure 55:
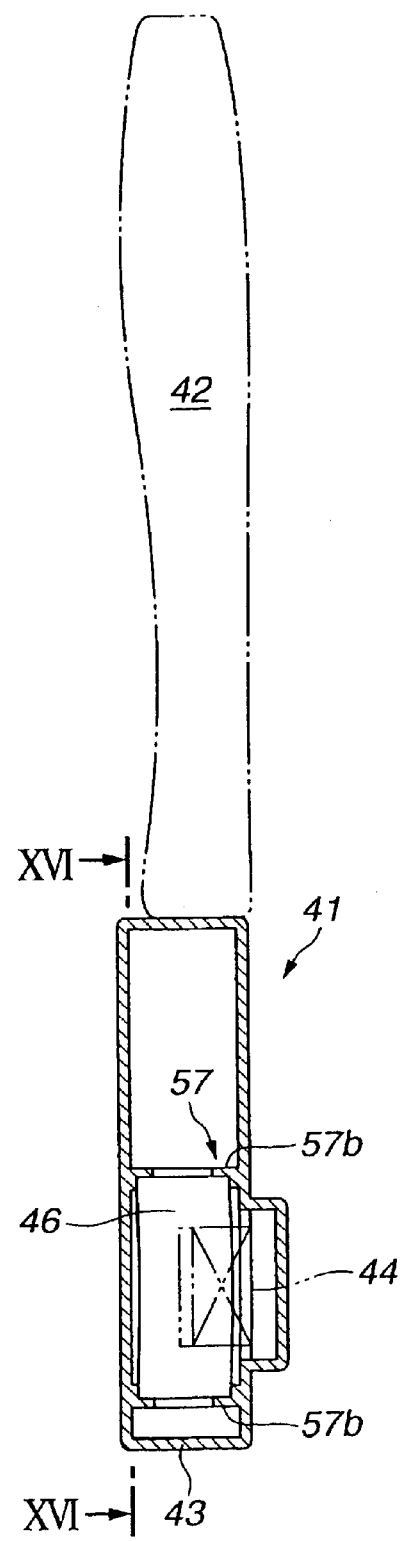
FIG. 55 is a XVII—XVII sectional view of FIG. 54.

FIGS. 54–56 show a fifth embodiment. Here, FIG. 54 is a front elevational view corresponding to a XVI—XVI cross section of FIG. 55, FIG. 55 is a XVII—XVII sectional view of FIG. 54, and FIG. 56 is a XVIII—XVIII sectional view of FIG. 54.

This embodiment is arranged such that the cabinet 43 is formed integrally in a bag shape, and a holding member 57 having a wall surface portion 57a and side walls 57b is formed in the cabinet 43 integrally therewith to thereby form a prism accommodation chamber 43c in the cabinet 43. The wall surface portion 57a receives the apexes P1 and P2 of the first optical surface 46a of the Free-Form-Surface prism 46 at the four positions thereof and the outside ridge lines L1, and the side walls 57b are abutted against the side surfaces 46d of the Free-Form-Surface prism 46 and position the side surfaces 46d. Further, a side surface of the prism accommodation chamber 43c is opened to the cabinet 43, and the opening is closed with a lid member 57c.

In assembly, the Free-Form-Surface prism 46 is attached to the prism accommodation chamber 43c from the opening opened to the side surface of the cabinet 43. Thus, when the Free-Form-Surface prism 46 is inserted to a deepest portion while being guided through the side surfaces 46d thereof in the state in which the positions of the side surfaces 46d are regulated by the side walls 57b, the apexes P1 and P2 formed to the first optical surface 46a at the four positions thereof and the outside ridge lines L1 are abutted against and positioned or held by the rear wall surface 57a. Accordingly, the Free-Form-Surface prism 46 can be positioned or held by bonding the apexes P1 and P2 at the four positions and the outside ridge lines L1 to the wall surface 57a.

Then, after the Free-Form-Surface prism 46 has been positioned or held in the prism accommodation chamber 43c as prescribed, the opening defined through the side surface of the cabinet 43 is closed by the lid member 57c as well as fixed using an adhesive, or the like.

As described above, according to this embodiment, even it is difficult to attach the Free-Form-Surface prism 46 from the outside because the cabinet 43 is formed integrally in the bag shape, it can be simply attached from the outside with a pinpoint accuracy. Accordingly, the Free-Form-Surface prism 46 can be simply attached to a product to which a water-proof structure is required, thereby a range to which the product is applied can be expanded.

Figure 57:
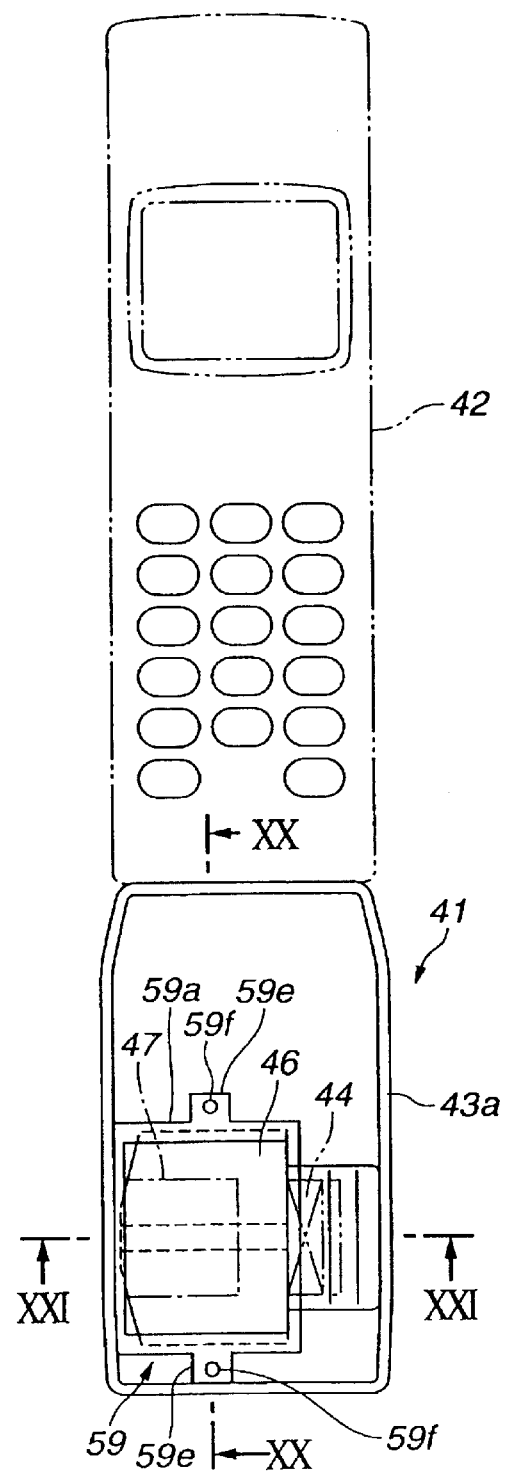
FIG. 57 is a front elevational view of a video display device of the sixth embodiment from which a front case is removed.
Figure 58:
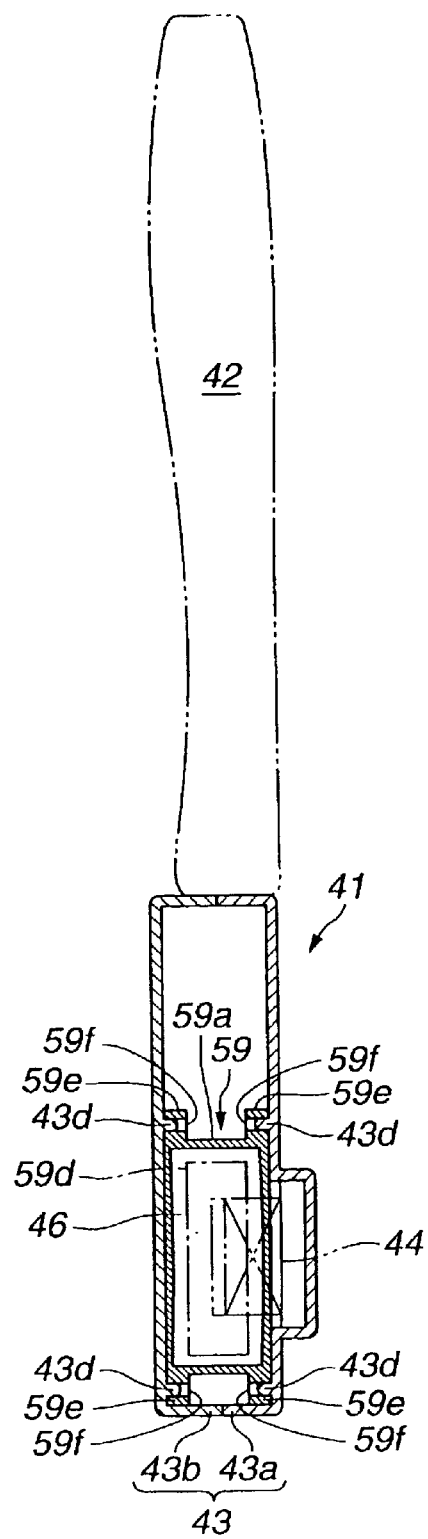
FIG. 58 is a XX—XX sectional view of FIG. 57.
Figure 59:
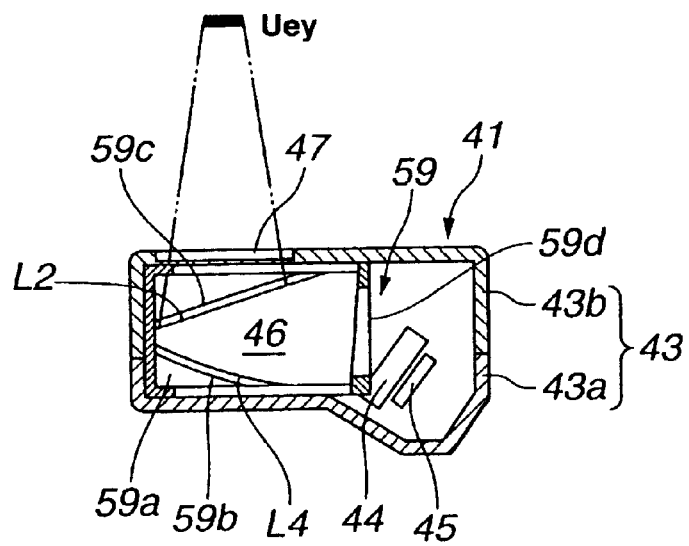
FIG. 59 is a XXI—XXI sectional view of FIG. 57.

FIGS. 57–59 show a sixth embodiment. Here, FIG. 57 is a front elevational view of a video display device from which the front case is removed, FIG. 58 is a XX—XX sectional view of FIG. 57, and FIG. 59 is a XXI—XXI sectional view of FIG. 57.

In this embodiment, a holding member 59 is formed in a frame shape, the Free-Form-Surface prism 46 is accommodated in the holding member 59 formed in the frame shape (hereinafter, referred to as "frame member"), and the frame member 59 is accommodated in the cabinet 43.

An opening is defined through the frame member 59 on the surface thereof confronting the first optical surface 46a of the Free-Form-Surface prism 46. Further, the inner surfaces of side walls 59a position or hold the side surfaces 46d of the Free-Form-Surface prism 46 as well as flange portions 59b and 59c are formed from the side walls 59a inwardly so as to position or hold the outside ridge lines L4, which are formed by intersecting the third optical surface 46c to the side surfaces 46d, and the outside ridge lines L2, which are formed by intersecting the second optical surface 46b to the side surfaces 46d.

When the Free-Form-Surface prism 46 is inserted from the opening defined through the frame member 59, the outside ridge lines L4 and L2 are positioned or held by being clamped by the flange portions 59b and 59c as well as the side surfaces 46d are poisoned or held by the side walls 59a, and further the extreme end is poisoned or held by being abutted against the inner surface of the frame member 59.

As a result, the Free-Form-Surface prism 46 is automatically poisoned only by being attached to the frame member 59.

Then, when the opening of the frame member 59 is closed with the lid member 57c and fixed using an adhesive, or the like after the Free-Form-Surface prism 46 has been attached to the frame member 59 as prescribed, the apexes P1 and P2 of the first optical surface 46a of the Free-Form-Surface prism 46 at the four positions thereof and the outside ridge lines L1 are poisoned or held.

A pair of confronting mounting portions 59e that extend outward are formed to the end edges of the side walls 59a abutted against the inner surfaces of the front case 43b and the rear case 43a, respectively, and mounting holes 59f are drilled through the respective mounting portions 59e.

When the frame member 59 is assembled to the cabinet 43, first, the mounting hole 59f drilled through one of the mounting portions 59e of the frame member 59 is positioned or held by being fitted on a projecting portion 43d projecting from the inner surface of one of the rear case 43a and the front case 43b. Then, when the rear case 43a and the front case 43b are closed, a projecting portion 43d projecting from the inner surface of the other of the rear case 43a and the front case 43b is positioned or held by being inserted into the mounting hole 59f drilled through the other mounting portion 59e.

As described above, in this embodiment, since the Free-Form-Surface prism 46 is fixed to the cabinet 43 through the frame member 59, the Free-Form-Surface prism 46 can be assembled without directly touching it. Further, since the Free-Form-Surface prism 46 is previously accommodated in the frame member 59, it can be effectively protected from damage, defect, or the like in transportation, or the like, thereby a handling property is improved. In particular, since the third optical surface 46c is subjected to reflection coating processing for total reflection, the reflecting surface thereof can be effectively protected from damage or the like, thereby the defective fraction of products can be reduced.

Figure 62:
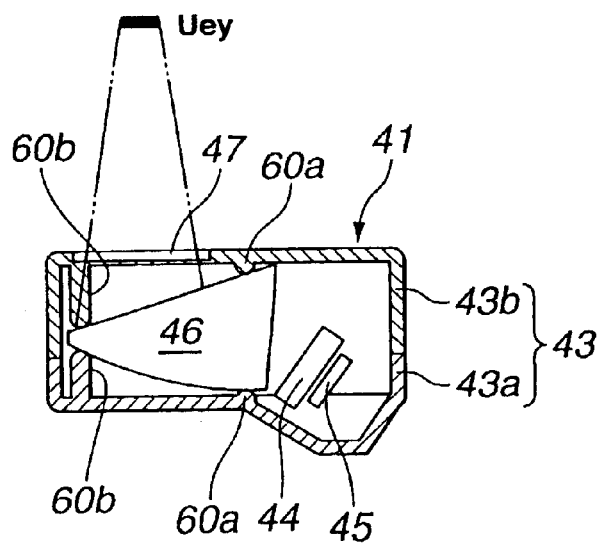
FIG. 62 is a XXIV—XXIV sectional view of FIG. 60.
Figure 60:
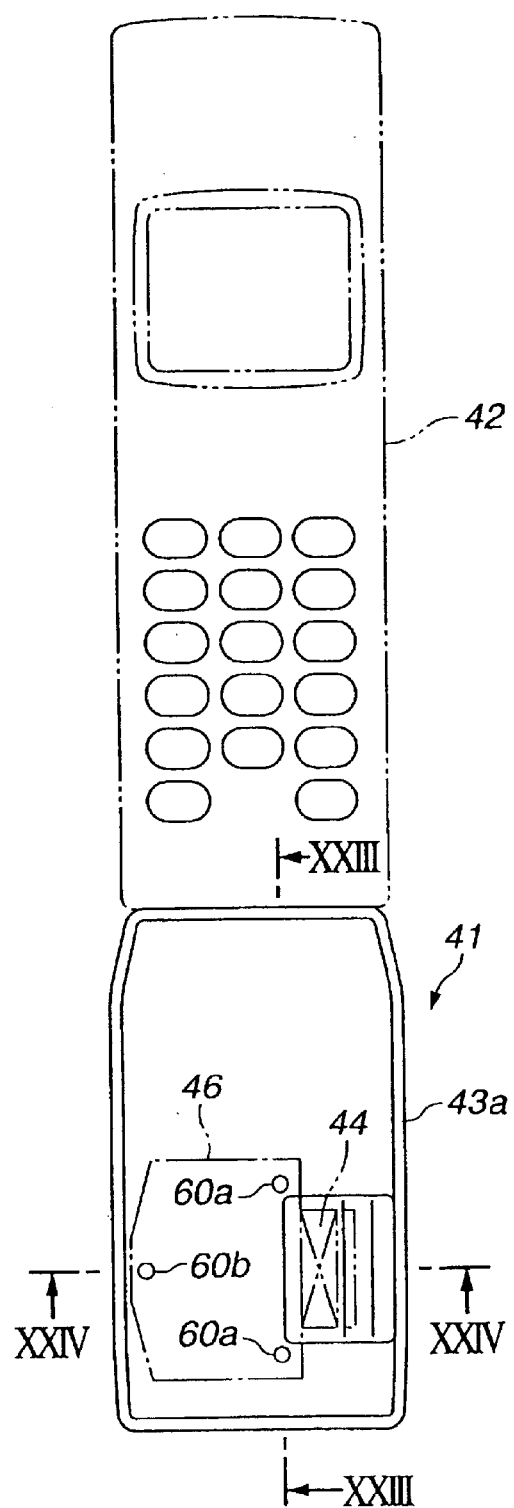
FIG. 60 is a front elevational view of a video display device of the seventh embodiment from which a front case is removed.
Figure 61:
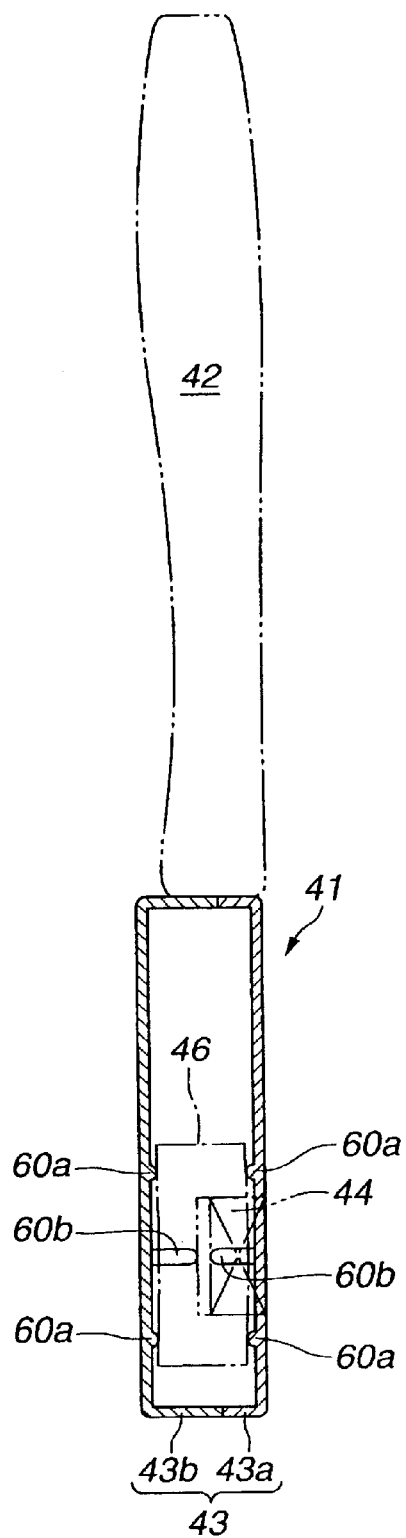
FIG. 61 is a XXIII—XXIII sectional view of FIG. 60.

FIGS. 60–62 show a seventh embodiment. Here, FIG. 60 is a front elevational view of a video display device from which the front case is removed, FIG. 61 is a XXIII—XXIII sectional view of FIG. 60, and FIG. 62 is a XXIV—XXIV sectional view of FIG. 60.

In this embodiment, the Free-Form-Surface prism 46 is supported at three points from both the surfaces thereof.

That is, a pair of projecting portions 60a and 60a project from the inner surfaces of the rear case 43a and the front case 43b at positions line symmetrical to the center of the Free-Form-Surface prism 46 in parallel with the first optical surface 46a of the Free-Form-Surface prism 46. Further, other projecting portions 60b project to the extreme end of the Free-Form-Surface prism 46 at the center thereof.

When the rear case 43a and the front case 43b are closed, the projecting portions 60a and 60b projecting from both the cases 43a and 43b come into point contact with the third optical surface 46c and the second optical surface 46b of the Free-Form-Surface prism 46, whereby both the optical surfaces 46c and 46b are supported thereby at the three points. In this case, the formation of recessed portions to both the optical surfaces 46c and 46b at the positions thereof corresponding to the projecting portions 60a and 60b permits positioning to be executed more accurately. As described above as to the respective embodiments, since the Free-Form-Surface prism 46 is positioned with respect to or held by the cabinet using the outside ridge lines of the Free-Form-Surface prism 46 and the apexes thereof, various mounting methods can be employed and an optimum mounting method can be selected to any of cabinets in these embodiments. As a result, not only a degree of freedom in design is increased but also the space in the cabinet can be effectively used.

Figure 63:
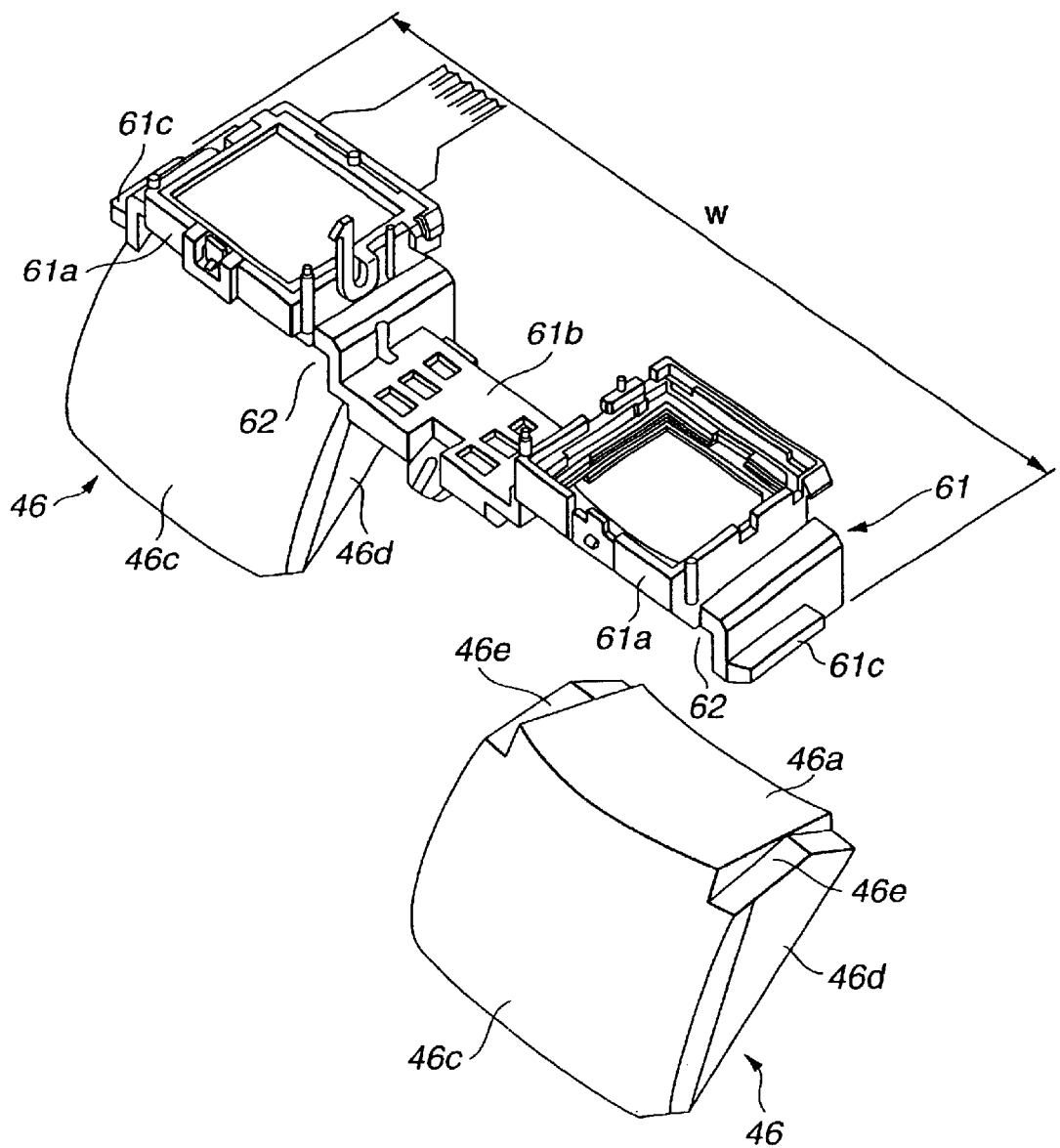
FIG. 63 is a perspective view of a main portion of a head mounting type video display device of the eighth embodiment.

Further, FIG. 63 shows a perspective view of a main portion of a head mounting type video display device (HMD) of an eighth embodiment.

An optical system holding member 61 contained in the head mounting type video display device includes a pair of right and left optical system holding units 61a which are coupled with each other through a coupling portion 61b.

Stepped portions 46e are formed to the first optical surface 46a of each Free-Form-Surface prism 46, which is attached to each optical system holding unit 61a, on the side surface 46d sides thereof. These stepped portions 46e are formed approximately linearly along the direction in which the metal mold is divided. Each optical system holding unit 61a has recessed portion 62 formed thereto, and the recessed portion 62 fits to the portion between the stepped portions 46e as well as position or hold it. Further, flange portions 61c are formed to the lower ends of the recessed portion 62 so as to project outward and be bent.

Each Free-Form-Surface prism 46 is poisoned or held by fitting the first optical surface 46a to the recessed portion 62 formed to the optical system holding unit 61a and by abutting the stepped portions 46e formed approximately linearly against the flange portions 61c. Then, the Free-Form-Surface prism 46 is fixed in this state using an adhesive or the like.

As described above, since the Free-Form-Surface prisms 46 are fixed to the optical system holding units 61a without using screws or the like in this embodiment, no space is necessary to attach the screws, thereby the width W of the optical system holding units 61 can be relatively reduced.

Figure 64:
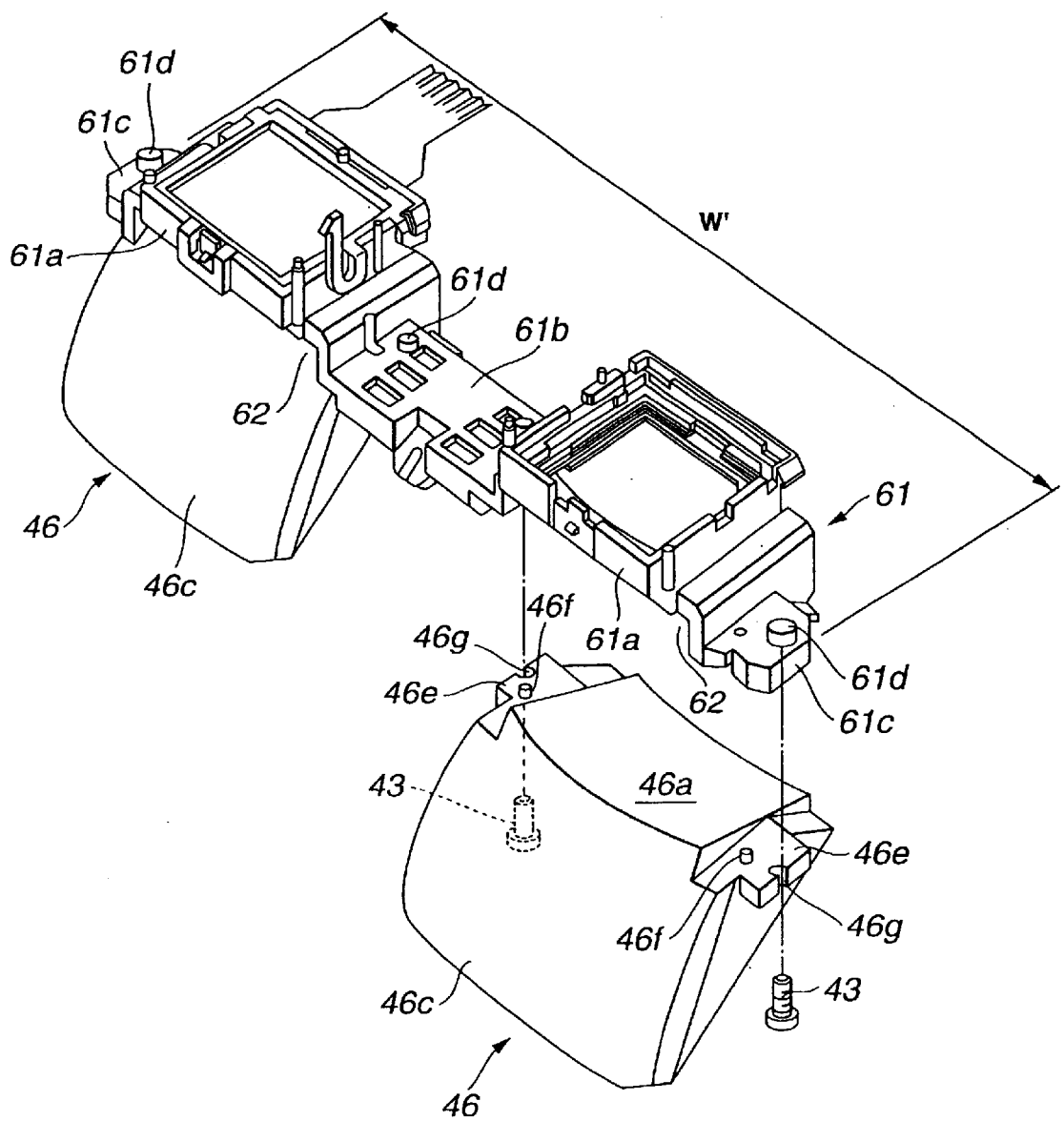
FIG. 64 is a perspective view of a main portion of a head mounting type video display device of a prior example.

By the way, FIG. 64 shows a perspective view of a main portion of a head mounting type video display device (HMD) employing a mounting method of a prior example. As shown in FIG. 64, the Free-Form-Surface prism 46 has flange portions projecting outward from the stepped portions 46e to secure hole portions 46g through which screws 63 are inserted. On the other hand, the flange portions 61c of the optical system holding member 61 must project long outward to receive the flange portions projecting from the stepped portions 46e, thereby the width W' of the optical system holding member 61 is increased with an increase in size.

Further, this display device has a complex shape and structure, and thus there is a disadvantage that it must be manufactured and assembled by a complicated manner as well as the weight thereof is increased in its entirety. This is because flange portions 61c have receiving portions 61d projecting therefrom so as to receive screws driven thereinto, whereas positioning projections 46f are formed to the stepped portions 46e of the Free-Form-Surface prism 46.

Note that the present invention is by no means limited to the respective embodiments described above, and for example, the surface of the third optical surface 46c of the Free-Form-Surface prism 46 may be subjected to rubber coating processing to protect the reflection coating layer thereof, or the vicinity of a reflection coating surface may be protected with rubber coating.

Further, damage prevention members may be interposed between the outside ridge lines of the Free-Form-Surface prism 46 and the holding member for holding them. In this case, buffer members bonded to the holding member or a paint coated on the holding member may be used as the damage prevention members.

According to image observation device described above, it is possible to realize the cost reduction of a product by decreasing the portions of the Free-Form-Surface prism requiring a dimensional accuracy as well as to relatively easily assemble the product without influencing optical characteristics, thereby not only productivity can be improved but also the reduction of size and weight of the product can be realized.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An optical element for enlarging an image displayed on a small image display element, comprising:
   a first optical surface for capturing the image, the first optical surface approximately facing a display surface of the image display element;
   a second optical surface for reflecting light beams incident from the first optical surface inside of the optical element and for causing the light beams of an enlarged image to proceed to the eye balls of an observer;
   at least one reflection optical surface that serves to cause at least one internal reflection, so that the light beams incident from the first optical surface reach the second optical surface;
   side surfaces that do not produce an optical action, said optical element comprising optically effective portions and optically ineffective portions; and
   element fixing mounting portions disposed to any of the first to second optical surfaces and the reflection optical surface physically coupled to locations that are within said optically ineffective portion.

2. An optical element according to claim 1, wherein at least one of the first to second optical surfaces and the reflection optical surface has a shape that is surface symmetrical with respect to only one subject surface.

3. An optical element according to claim 1, wherein the element fixing mounting portions are disposed to a spacer portion formed cylindrically from the first optical surface to the image display element.

4. An optical element according to claim 3, wherein at least a part of the spacer portion forms a guide portion in a direction approximately parallel to the optical axis incident on the first optical surface as well as an element holding member for holding the image display element is arranged so as to move along the guide portion.

5. An optical element according to claim 1, wherein the element fixing mounting portions are disposed on a surface parallel with or perpendicular to the optical axis incident on the first optical surface.

6. An optical element according to claim 1, wherein the element fixing mounting portions are disposed on a surface parallel with or perpendicular to the optical axis outgoing from the second optical surface.

7. An optical element for enlarging an image displayed on a small image display element, characterized by comprising:
   a first optical surface for capturing the image approximately facing the display surface of the image display element;
   a second optical surface for reflecting the light beams incident from the first optical surface in the inside of the element as well as for finally causing the light beams of an enlarged image to proceed to the eye balls of an observer;
   at least one reflection optical surface for contributing to at least one internal reflection so that the light beams incident from the first optical surface reach the second optical surface; and
   side surfaces that do not contribute to an optical action, the optical element comprising:
     element fixing mounting portions,
     wherein the element fixing mounting portions are formed to be separated from the optical element by grooves formed on at least any two surfaces of the respective surfaces by which the optical element is formed and are located on the side surfaces.

8. An optical element according to claim 7, wherein at least one of the first to second optical surfaces and the reflection optical surface has a shape that is surface symmetrical with respect to only one subject surface.

9. An optical element according to claim 7, wherein the element fixing mounting portions are disposed to a spacer portion formed cylindrically from the first optical surface to the image display element.

10. An optical element according to claim 9, wherein at least a part of the spacer portion forms a guide portion in a direction approximately parallel to the optical axis incident on the first optical surface as well as an element holding members for holding the image display element is arranged so as to move along the guide portion.

11. An optical element according to claim 7, wherein the element fixing mounting portions are disposed on a surface parallel with or perpendicular to the optical axis incident on the first optical surface.

12. An optical element according to claim 7, wherein the element fixing mounting portions are disposed on a surface parallel with or perpendicular to the optical axis outgoing from the second optical surface.

13. An optical element according to claim 7, wherein the element fixing mounting portions are disposed externally of an effective light beam range contributing to a function for causing the light beams of the enlarged image to outgo to the eye balls of the observer of the first to second optical surfaces and the reflection optical surface.

14. An image observation device comprising:
   a small image display element for displaying an image;
   an optical element; and
   element fixing mounting portions disposed to any of first to second optical surfaces and a reflection optical surface in the optical element externally of an effective light beam range contributing to a function for causing the light beams of an enlarged image to proceed to the eye balls of the observer,
   wherein the optical element comprises:
      a first optical surface for capturing the image approximately facing the display surface of the image display element;
      a second optical surface for reflecting the light beams incident from the first optical surface in the inside of the element as well as for finally causing the light beams of the enlarged image to proceed to the eye balls of an observer;
      at least one reflection optical surface for contributing to at least one internal reflection so that the light beams incident from the first optical surface reach the second optical surface; and
      side surfaces that do not contribute to an optical action.

15. An image observation device comprising:
   a small image display element for displaying an image;
   an optical element; and
   element fixing mounting portions formed to be separated from the optical element by grooves formed on at least any two surfaces of the respective surfaces by which the optical element is formed as well as disposed externally of an effective light beam range for contributing to causing the light beams of an enlarged image to proceed to the eye balls of the observer in order to position and fix the optical element,
   wherein the optical element comprises:
      a first optical surface for capturing the image approximately facing the display surface of the image display element;
      a second optical surface for reflecting the light beams incident from the first optical surface in the inside of the element as well as for finally causing the light beams of an enlarged image to proceed to the eye balls of an observer;
      at least one reflection optical surface for contributing to at least one internal reflection so that the light beams incident from the first optical surface reach the second optical surface; and
      side surfaces that do not contribute to an optical action.

16. An image observation device, characterized by comprising:
   a video display element for displaying a video image;
   at least one Free-Form-Surface prism for enlarging the video image and introducing it to an observer;
   a holding member for holding the video display element and the Free-Form-Surface prism; and
   an exterior member for surrounding the video display element and the Free-Form-Surface prism,
   wherein the Free-Form-Surface prism is positioned or held with respect to or by at least one of other optical element, the holding member, and the exterior member using at least one ridge line or apex of the Free-Form-Surface prism.

17. An image observation device according to claim 16, wherein the positioning of the Free-Form-Surface prism is executed by a ridge line or an apex disposed around a surface facing the video display surface of the video display element.

18. An image observation device according to claim 16, wherein the positioning of the Free-Form-Surface prism is executed using a ridge line formed approximately parallel with or perpendicular to the mold dividing direction of a metal mold when the Free-Form-Surface prism is formed.

19. An image observation device according to claim 16, wherein the Free-Form-Surface prism is positioned with respect to or held by the exterior member by the ridge line around an injection surface.

* * * * *